(12) United States Patent
Matsuoka et al.

(10) Patent No.: US 8,318,824 B2
(45) Date of Patent: Nov. 27, 2012

(54) HYDROPHILIC POLYOLEFIN SINTERED BODY

(75) Inventors: Naoki Matsuoka, Tokyo (JP); Minoru Yamamoto, Tokyo (JP); Shigeru Nakajima, Tokyo (JP); Takahiro Deguchi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 221 days.

(21) Appl. No.: 12/670,578

(22) PCT Filed: Jul. 24, 2008

(86) PCT No.: PCT/JP2008/063296
§ 371 (c)(1),
(2), (4) Date: Jun. 14, 2010

(87) PCT Pub. No.: WO2009/017030
PCT Pub. Date: Feb. 5, 2009

(65) Prior Publication Data
US 2012/0095121 A1 Apr. 19, 2012

(30) Foreign Application Priority Data

Jul. 27, 2007 (JP) ................................. 2007-195287
Aug. 7, 2007 (JP) ................................. 2007-205526

(51) Int. Cl.
*C08J 9/24* (2006.01)
*C08J 9/36* (2006.01)

(52) U.S. Cl. ........ 521/142; 521/143; 521/149; 525/193; 525/142; 525/326.1; 525/340; 525/374

(58) Field of Classification Search .................. 521/142, 521/143, 149; 525/193, 142, 326.1, 340.374
See application file for complete search history.

(56) References Cited

U.S. PATENT DOCUMENTS
2004/0212123 A1   10/2004   Koizumi et al.

FOREIGN PATENT DOCUMENTS

| JP | 51-140885 | | 12/1976 |
|----|-----------|---|---------|
| JP | 3-028457 | B | 1/1984 |
| JP | 3-063577 | B | 1/1984 |
| JP | 4-028021 | B | 3/1989 |
| JP | 5-156057 | A | 6/1993 |
| JP | 6-122779 | A | 5/1994 |
| JP | 2001-353788 | A | 12/2001 |
| JP | 2001-354796 | A | 12/2001 |
| JP | 2003040942 | A * | 2/2003 |
| JP | 2005-510608 | A | 6/2003 |
| JP | 2004-035582 | A | 2/2004 |
| WO | WO 03-014205 | A1 | 2/2003 |
| WO | 2006-106487 | A1 | 10/2006 |

OTHER PUBLICATIONS

Communication—Supplementary European Search Report for European Application No. EP 08 79 1548 dated Sep. 30, 2011.

* cited by examiner

*Primary Examiner* — Irina S Zemel
(74) *Attorney, Agent, or Firm* — Morgan, Lewis & Bockius LLP

(57) ABSTRACT

Disclosed is a hydrophilic polyolefin sintered material which is a water-absorbing sintered material of a polyolefin resin ice having a graft chain composed of at least one molecular chain selected from hydrophilic ethylenically unsaturated group-containing monomers and their polymers. This hydrophilic polyolefin sintered material has an average porosity of 20-80% by volume and an open cell having an average pore diameter of 1-150 μm.

20 Claims, No Drawings

HYDROPHILIC POLYOLEFIN SINTERED BODY

RELATED APPLICATIONS

The present application is a U.S. National Phase Application of International Application No. PCT/JP2008/063296, filed Jul. 24, 2008, which claims the benefit of Japanese Patent Application No. 2007-195287, filed Jul. 27, 2007 and Japanese Patent Application No. 2007-205526, filed Aug. 7, 2007, all of which are hereby incorporated by reference in their entirety.

TECHNICAL FIELD

The present invention relates to a hydrophilic porous sintered material of polyolefin resin particles. More specifically, the present invention relates to a hydrophilic porous sintered material which is industrially producible, has continuous pores and is excellent in long-lasting sustainability of water-absorbing functions and low dissolubility.

BACKGROUND ART

A porous sintered material of polyolefin resin particles having continuous pores has excellent characteristics such as fluid filtration function, permeability function and induction function and is widely utilized as a filter, an aeration tube, an induction material for liquid and the like. Specifically, a hydrophilic porous sintered material mainly comprising hydrophilized polyethylene is utilized for uses such as absorption, diffusion, transpiration, permeation, induction of water and the like, utilizing its absorption functions. For example, a polyolefin sintered material described in PATENT DOCUMENT 1 has been out into practical use in a material for absorbing dew condensation water in the vegetable compartment, chilled compartment or the like of the refrigerator and a humidifier in the refrigerator, a humidification element of the conditioner or the like, an ink absorber in the printer, and the like.

Porous materials having water-absorbing functions include, besides a hydrophilic polyolefin porous sintered material, cloth and nonwoven fabric of hydrophilized synthetic fiber, asbestos cloth or natural fiber textile, fabric such as paper, hollow fiber membrane and microporous membrane of hydrophilized thermoplastic resin, sintered material of metal and ceramics, water-absorbent polymeric material, and the like. Since the hydrophilic polyolefin porous sintered material comprises all advantages such as the very small change in dimension by swelling upon absorbing water or the like, maintaining high strength as a compact, and being capable of coping with complicated shapes, the development in various fields such as electronics and biotechnology has been expected.

In order to meet the above expectations, it is important sustain water-absorbing functions, and some methods have been suggested in the past.

PATENT DOCUMENT 2 and PATENT DOCUMENT 3 describe a sintered material of polyethylene resin particles whose particle surface is sulfonated. However, due to severe production method comprising the step of sulfonating with fuming sulfuric acid, hot concentrated sulfuric acid or the like, by-product accompanied with oxidation, dehydration or the like is much generated, and further, it is problems that discoloration and deterioration of polyolefin resin are caused and it is a very hazardous chemical reaction.

PATENT DOCUMENT 4 describes a sintered material obtained by introducing a grafted polymer chain into polyolefin resin particles and thereafter substituting a functional group on the surface. However, in the above method, since the grafted polymer chain does not have hydrophilicity, water-absorbing functions are not found in the sintered material, and water cannot be passed through pores in the sintered material unless applying pressure.

PATENT DOCUMENT 5 describes a method of hydrophilizing a sintered material, comprising the steps of providing hydrophilicity by treating the surface of a sintered material with oxygen plasma or the like, and thereafter applying a coating material thereon. In this method, adhesion of the coating material is increased by high-energy treatment. However, since the coating material itself is not a material that can withstand severe conditions such as hot water treatment or the like, sustainability of water-absorbing functions is not increased.

In addition to the above, as a method of hydrophilizing polymeric materials such as hollow fiber and microporous membrane, for example, as described in PATENT DOCUMENT 6, PATENT DOCUMENT 7 and the like, a method of grafting a functional group by ionizing radiation is suggested. However, all polymeric materials exemplified the above documents are practically thin films, so that it is very difficult to spontaneously suction and hold water utilizing capillary action and repeatedly use water while maintaining rigidity and dimensional stability upon absorbing water as a compact. In addition, even though water is absorbed, water easily seeps out only by gently pressing the polymeric material. Therefore, upon practically utilizing the above polymeric materials, an insufficient property must be compensated by complexing with other materials. However, since the junction of materials are at high risk of being structural defect, substantial effort and cost are required for complexing, and it ends up going through very inefficient step in the industrial process.

With the development of industry using functional composite materials, expectations for a hydrophilic polyolefin sintered material as a polymeric material having plural functions are further being raised. However, despite being utilized as a compact through the ages, specific examples for sustaining water-absorbing functions of the porous sintered material of polyolefin resin particles have not yet been shown. This is because the sintered material has comparatively large pores as a porous material and is a thick compact, so that even very minor water-absorbing defect ends up having an enormous influence on bulky water-absorbing functions. Therefore, for the realization of hydrophilic polyolefin sintered material having both long-lasting sustainability of water-absorbing functions and low dissolubility, problems in both improvement in water-absorbing functions and basic structure as a compact need to be solved.

PATENT DOCUMENT 1: JP-B-H04-28021
PATENT DOCUMENT 2: JP-B-H03-28457
PATENT DOCUMENT 3: JP-B-H03-63577
PATENT DOCUMENT 4: WO2003-14205
PATENT DOCUMENT 5 JP-A-2005-510608
PATENT DOCUMENT 6: JP-A-H05-156057
PATENT DOCUMENT 7: JP-A-2004-35582

DISCLOSURE OF THE INVENTION

Problems to be Solved by the Invention

The present invention has been made in view of the above situation. An object the present invention is to provide a hydrophilic porous sintered material which is industrially producible, has continuous pores and is excellent in long-lasting sustainability of water-absorbing functions and low dissolubility.

Means for Solving the Problems

As the result of intensive studies to solve the above problems, the present inventors have found that at least one molecular chain selected from hydrophilic ethylenically unsaturated group-containing monomers and polymers thereof is grafted onto a sintered material comprising polyolefin resin particles, whereby a hydrophilic polyolefin sintered material having excellent water-absorbing functions can be easily obtained. Even more surprisingly, the hydrophilic polyolefin sintered material to which hydrophilicity is uniformly provided by grafting has both long-lasting sustainability of water-absorbing functions and low dissolubility. The present invention has been accomplished based on the knowledge More specifically, the present invention is as follows.
(1) A hydrophilic polyolefin sintered material which is a water absorbing sintered material polyolefin resin particles having a graft chain comprising at least one molecular chain selected from hydrophilic ethylenically unsaturated group-containing monomers and polymers thereof, wherein the hydrophilic polyolefin sintered material has an average porosity 20% to 80% by volume and a continuous pore having an average pore diameter of 1 to 150 μm.
(2) The hydrophilic polyolefin sintered material according to (1), wherein the hydrophilic ethylenically unsaturated group-containing monomers have at least one functional group selected from a phosphorylcholine group, a hydroxyl group, a carboxyl group, an amino group, an amide group, an alkoxy group, a sulfo group or salts thereof.
(3) The hydrophilic polyolefin sintered material according to (1) or (2), wherein the hydrophilic ethylenically unsaturated group-containing monomers comprise at least one monomer selected from methacryloyloxyalkyl phosphorylcholines and acryloyloxyalkyl phosphorylcholines represented by the following general formula (1):

[Formula 1]

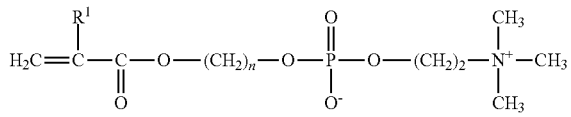

(1)

wherein, $R^1$ is a hydrogen atom or a methyl group, and n is an integer number of 2 to 10.
(4) The hydrophilic polyolefin sintered material according to any one of (1) to (3), wherein the hydrophilic ethylenically unsaturated group-containing monomers comprise at least one monomer selected from 2-methacryloyloxyethyl phosphorylcholine, 2-hydroxypropyl acrylate, 2-hydroxyethyl methacrylate, 2-diethylaminoethyl methacrylate and vinyl sulfonic acid.
(5) The hydrophilic polyolefin sintered material according to any one of (1) to (4), wherein the hydrophilic ethylenically unsaturated group-containing monomers have a graft ratio of 0.01% to 50%.
(6) The hydrophilic polyolefin sintered material according to any one of (1) to (5), wherein the polyolefin is a homopolymer of ethylene or a copolymer of ethylene and an olefin having 3 or more carbon atoms.
(7) The hydrophilic polyolefin sintered material according to any one of (1) to (6), wherein the polyolefin resin particles comprising the hydrophilic polyolefin sintered material have an average particle diameter of 10 to 350 μm, a particle diameter of 90% by weight or more of the particles in the range of 1 to 500 μm, a bulk density of 0.20 to 0.55 g/cm$^3$, a density of 0.850 to 0.970 g/cm$^3$, and a viscosity-average molecular weight of 50,000 to 7,000,000.
(8) The hydrophilic polyolefin sintered material according to any one of (1) to (7), having a drop absorption time of 30 seconds or less and a water suction height of 5 mm or more per minute.
(9) The hydrophilic polyolefin sintered material according to any one of (1) to (8), wherein the hydrophilic polyolefin sintered material after removing a 60° C. hot water-soluble component has a drop absorption time of 30 seconds or less and a water suction height of 5 mm or more per minute.
(10) The hydrophilic polyolefin sintered material according to any one of (1) to (9), having a ratio of maximum value Y to minimum value X of the water suction height, i.e., Y/X, in the range of 1.0 to 2.0 times per minute.
(11) The hydrophilic polyolefin sintered material according to any (1) to (10), wherein the hydrophilic polyolefin sintered material after removing 60° C. hot water-soluble component has a ratio of maximum value Y to minimum value X of the water suction height, i.e., Y/X, in the range of 1.0 to 2.0 times per minute.
(12) A method of producing the hydrophilic polyolefin sintered material according to any one of (1) to (11), comprising the step or grafting at least one molecular chain selected from the hydrophilic ethylenically unsaturated group-containing monomers and polymers thereof onto polyolefin resin particles or a sintered material thereof in a liquid phase.
(13) The method of producing the hydrophilic polyolefin sintered material according to (12), comprising the step of grafting at least one molecular chain selected from the hydrophilic ethylenically unsaturated group-containing monomers and polymers thereof onto polyolefin resin particles or a sintered material thereof in a liquid phase from which dissolved oxygen is removed.
(14) The method of producing the hydrophilic polyolefin sintered material according to (12) or (13), wherein the polyolefin resin particles are packed into a mold and thereby sinter-molded.
(15) The method of producing the hydrophilic polyolefin sintered material according to (12) or (13), wherein polyolefin resin particles are deposited and thereby sinter-molded.
(16) The method of producing the hydrophilic polyolefin sintered material according to any one of (12) to (15), wherein the polyolefin resin particles is sinter-molded and thereafter at least one molecular chain selected from the hydrophilic ethylenically unsaturated group-containing monomers and polymers thereof is grafted.
(17) The method of producing the hydrophilic polyolefin sintered material according to any one of (12) to (15), wherein at least one molecular chain selected from the hydrophilic ethylenically unsaturated group-containing monomers and polymers thereof is previously grafted onto the polyolefin resin particles and thereafter the particles are sinter-molded.

(18) The method of producing the hydrophilic polyolefin sintered material according to any one of (12) to (17), wherein grafting is carried out by exposure to ionizing radiation.
(19) The method of producing the hydrophilic polyolefin sintered material according to (18), wherein the ionizing radiation is γ-ray.
(20) The method of producing the hydrophilic polyolefin sintered material according to (18) or (19), wherein the exposure dose of the ionizing radiation is in the range of 1 kGy to 1,000 kGy.
(21) The method of producing the hydrophilic polyolefin sintered material according to any one of (18) to (20), wherein the hydrophilic polyolefin sintered material is obtained by previously exposing polyolefin resin particles or a sintered material thereof to ionizing radiation and thereafter contacting the particles or sintered material with hydrophilic ethylenically unsaturated group-containing monomers.
(22) The method of producing the hydrophilic polyolefin sintered material according to any one of (12) to (17), wherein grafting is carried out by exposure to an active light.

Advantage of the Invention

According to the present invention, a hydrophilic porous sintered material which is industrially producible, has continuous pores and is excellent in long-lasting sustainability of water-absorbing functions can be easily obtained.

BEST MODE FOR CARRYING OUT THE INVENTION

The present invention will be specifically described hereinbelow. The term "polymerization" in the present invention is sometimes used in the meaning including not only simple polymerization but also copolymerization, and also the term "polymer" is sometimes used in the meaning including not only homopolymer but also copolymer.

In the present invention, "grafting" refers to a reaction of chemically combining a molecular chain comprising any ethylenically unsaturated group-containing monomers or polymers thereof with a polyolefin molecular chain that is a backbone. Here, the ethylenically unsaturated group-containing monomers of the present invention may be the one that polymerizes itself upon grafting to be a macromer or may be the one that does not form a homopolymer of monomer. In addition, a macromer previously polymerized may be used as the ethylenically unsaturated group-containing monomer. When a molecular chain comprised by the ethylenically unsaturated group-containing monomer that is a branch is immobilized on a polyolefin molecular chain that is a backbone via a covalent bond, it is a graft chain, and an object of the present invention is achieved.

The hydrophilic polyolefin sintered material in the present invention is a water-absorbing sintered material comprising polyolefin resin particles, and the biggest feature is having water-absorbing functions. "Water-absorbing function" in the present invention refers to a phenomenon of spontaneously taking water into the inside of the pores in porous material at 25° C. under atmospheric pressure and is not limited as far as the intake of water is not inhibited by surface tension. It is preferred that the water taken in by capillary action can be diffused in a direction other than the direction of gravitational force.

The presence or absence of water-absorbing functions in the present invention is determined by the following method. Onto a sintered material packed so as to fill up a tray having inside dimensions of 50 mm length, 50 mm width and 2 mm height a drop having 35 μl is dropped from a position of 20 mm height using a micropipette manufactured by Eppendorf Co., Ltd., to confirm the time for absorbing the whole amount in the inside of the sintered material. A total of 10 drops are dropped onto non-overlapping positions. When all drops are each absorbed within 60 seconds or less, it is determined to have the water-absorbing functions in the present invention, and when even one drop is not absorbed within 60 seconds or less, it is determined to have no water absorbability in the present invention. As a method of packing the tray with a sintered material, a sintered material formed into the shape of the tray may be packed as it is, a sintered material may be packed by laminating or may be packed by lining cut pieces with the tray. When a sintered material has water-absorbing functions, the same determination results are obtained using any method. In addition, with the sintered material in an amount to fill up the tray, a volume that can absorb a total of 10 drops is enough secured, and therefore, it is acceptable even if the sintered material is over-packed. Here, a situation that a drop is absorbed into the sintered material in the present invention means that a situation that the drop seeps into the sintered material until an interface of the drop cannot be completely seen, and a situation that a gloss of interface can be confirmed, for example, a situation that the contact angle is decreased and the drop thinly spreads on a surface layer of the sintered material and a situation that the drop runs down the inner wall of the tray or the like and pools at the bottom of the tray are not contained. Therefore, the drop must be dropped from just above the sintered material so as not to directly contact to the inner wall of the tray.

The polyolefin resin particles used in the present invention are not particularly limited as far as the polyolefin resin particles are particulate polyolefin. Because it is capable of easily obtaining particles suitable for sinter molding, easy to sintermold and excellent in forming, moderately flexible and moderately rigid, excellent in chemical resistance, excellent in workability even after molding into a sintered material, excellent in dimension stability upon absorbing water by low hygroscopicity and water absorbability of the material and excellent in radical retention upon grafting, and the like, homopolymers such as ethylene, propylene, 1-butene, and 4-methyl-1-pentene, copolymer of ethylene or propylene and other α-olefin, a copolymer of ethylene and vinyl acetate, and a copolymer of ethylene, acrylic acid, methacrylic acid and esters thereof are preferable, and a homopolymer of ethylene or copolymer of ethylene and an olefin having 3 or more carbon atoms are particularly preferable.

The olefin having 3 or more carbon atoms to be copolymerized with ethylene includes propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, vinyl cyclohexane and the like, and propylene, 1-butene, 1-hexene and 1-octene are particularly preferable. Some of them can be combined and copolymerized with ethylene. In addition, olefin can be polymerized in the coexistence of a diene such as butadiene or isoprene, and further a diene can be also polymerized.

As the polyolefin resin particles used in the present invention, resin particles obtained by polymerization may be used as they are, or may be classified and used. In addition, a substance formed in a shape other than that of a particle is pulverized by a known method such as mechanical pulverization, freezing pulverization or chemical pulverization, and the resulting resin particles may be used as they are, or may be classified and used.

The shape of the polyolefin resin particles used in the present invention is not particularly limited. The particles may be in the form of true spheres or amorphous, and may comprise primary particles, secondary particles wherein a plurality of primary particles are agglomerated and integrated, or secondary particles which are further pulverized.

The method of producing the polyolefin resin particles used in the present invention is not particularly limited, and any production method of solution method, high-pressure method, high-pressure bulk method, slurry method and gas phase method that are generally used may be used. Slurry method or gas phase method that can directly obtain polyolefin resin particles by polymerization using an olefin polymerization catalyst is preferably used, and particularly, slurry method is preferably used. Polymerization pressure during production is not particularly limited, and a gauge pressure of 0.1 MPa to 300 MPa is normally used. In the case of slurry method, normal pressure to 10 MPa is preferable. Polymerization temperature is not particularly limited and is normally at a temperature of 25° C. to 300° C. In the case of slurry method, the temperature is preferably from 25° C. to 120° C., and particularly preferably from 50° C. to 100° C. As a solvent of slurry method, normally used inert hydrocarbon solvents are used. For example, the solvent includes aliphatic hydrocarbons such as isobutane, pentane, hexane and heptane, aromatic hydrocarbons such as benzene and toluene, or alicyclic hydrocarbons such a cyclohexane and methylcyclohexane, and the like.

The average particle diameter of the polyolefin resin particles in the present invention is the particle diameter where the cumulative weight is 50%, i.e., median diameter, and is not particularly limited. In order to secure enough amount of water absorption as the hydrophilic polyolefin sintered material and sufficiently exhibit water-absorbing functions by capillary action, the particle diameter is preferably in the range of 10 to 350 μm, and particularly preferably in the range of 30 to 350 μm. In addition, the particle diameter of 90% by weight or more of the particles is preferably in the range of 1 to 500 μm, and particularly preferably in the range of 5 to 450 μm. Here, in order that the particle diameter of 90% by weight or more of the particles is in the range of 1 to 500 μm, the cumulative weight of the particles having a particle diameter in the range of 1 to 500 μm separately calculated upon determining the average particle diameter needs only to be 90% by weight or more of the whole particles to be determined.

The bulk density of the polyolefin resin particles in the present invention is the value determined according to JIS K 6892 without adding an additive such as lubricant to the polyolefin resin particles and is not particularly limited. In order to secure enough amount of water absorption as the hydrophilic polyolefin sintered material and sufficiently exhibit water-absorbing functions by capillary action, the bulk density is preferably in the range of 0.20 to 0.55 g/cm$^3$ and particularly preferably in the range of 0.22 to 0.50 g/cm$^3$.

The density of the polyolefin resin particles in the present invention is the value determined according to JIS K 7112 using a section cut out from a press sheet of polyolefin resin particles and is not particularly limited. In order to secure rigidity and chemical-resistance without impairing flexibility as the hydrophilic polyolefin sintered material, the density is preferably in the range of 0.850 to 0.970 g/cm$^3$, and particularly preferably in the range of 0.920 to 0.960 g/cm$^3$.

The melting point of the polyolefin resin particles in the present invention was determined using a differential scanning calorimeter Pyris1 (trade name) manufactured by PerkinElmer Inc. The amount 8.4 mg of a sample was retained at 50° C. for 1 minute, thereafter the temperature was raised to 200° C. at a rate of 10° C./min., and the temperature showing the maximum peak in a melting curve obtained at that time was defined as a melting point.

The viscosity average molecular weight of the polyolefin resin particles in the present invention is the value obtained by converting the intrinsic viscosity obtained from the specific viscosity of a polymer solution to the viscosity average molecular weight and is not particularly limited. Since the flow of the resin that is a factor for inhibiting the formation of pores upon sinter molding is small and weldability of the adjacent polyolefin resin particles are excellent, the viscosity average molecular weight is preferably in the range of 50,000 to 7,000,000, more preferably in the range of 100,000 to 5,000,000, and particularly preferably in the range of 200,000 to 4,000,000.

The sintered material in the present invention is obtained by depositing polyolefin resin particles into a desired shape or packing them into a mold and thereafter heating to more than the melting point under pressureless or pressure condition while leaving gaps between the particles. The surface layer of the polyolefin resin particles is welded by heating, whereby a continuous pore can be easily formed. It should be noted that in order to obtain a long and large sintered material, continuously heating the deposited polyolefin resin particles is preferable, and in order to obtain a sintered material with fine and complex shape, heating using a mold is preferable. However, it is also possible to creatively use either method as necessary.

The shape of the sintered material is not particularly limited and can be, for example, in a shape such as plate, cylinder, column, prismatic column, sphere, rectangular parallelepiped, cube, and other products with different shapes. As a method of packing the particles into a mold, for example, a vibration type packing apparatus such as a vibratory repacker can be employed. While the influence of amplitude on the particles upon vibratory packing is relatively small, it is preferred that the vibratory packing is carried out for a necessary minimum time depending on the packing apparatus. This is because a long-term application of vibration brings about redistribution of particles, namely, the sinking of the particles having a smaller particle diameter into the lower part. The material of the mold is not particularly limited, and for example, iron, stainless, brass, aluminum and the like can be used. Aluminum is preferred since it is high in durability and small in heat capacity, light in weight and easy to handle. The shape of the mold is not particularly limited as far as the particles can be packed therein, such as a plate-like mold comprising two flat plates provided in parallel to each other and a cylindrical mold comprising two cylinders with different diameters disposed concentrically.

The heating method upon sinter molding in the present invention is not particularly limited as far as the method is controllable, and for example, methods such as a hot-air dryer, dielectric heating and electric resistance heating can be employed. The heating temperature is not particularly limited as far as the temperature is around the melting point of the polyolefin resin particles, at which the particles are sufficiently welded to each other but the resin does not flow and clog the gaps between the particles. For example, in the case of polyethylene, the heating temperature is preferably in the range of 110 to 220° C., and particularly preferably in the range of 120 to 180° C.

It is also possible to complex a substance that does not inhibit water-absorbing functions of the present invention, such as cloth, textile, fabric, nonwoven fabric, perforated film, microporous membrane or woven wire, with the surface or internal of the sintered material in the present invention. In addition, is also possible to provide a non-permeable or nonwater permeable film, membrane or the like a part of the sintered material so as not to exercise an effect of the absorbed water on surroundings. Further, it is also possible to provide a design by coloring, printing or the like. Sinter molding may be carried out adding a heat stabilizer, a weather-resistant agent, an odor absorbent, a deodorant, a fungicide, an antimicrobial, a perfume, a filler or the like as necessary. When the above additive is added, it is also possible to use a spreading agent such as liquid paraffin.

The continuous pore of the hydrophilic polyolefin sintered material in the present invention is a pore continued from one surface to another surface of the sintered material. The pore may be linear or curvilinear. In addition, the whole dimension may be uniform, or the dimensions of pore may be varied between, for example, surface layer and internal, or one surface layer and the other surface layer.

The average porosity of the hydrophilic polyolefin sintered material in the present invention is the value calculated according to the following formula.

Average Porosity(% by Volume)=[(True Density−Apparent Density)/True Density]×100 wherein, the true density (g/cm$^3$) refers to the density of the polyolefin resin particles, and the apparent density (g/cm$^3$) refers to the value obtained by dividing the weight of the sintered material by the volume calculated from the outer dimensions of the sintered material. The average porosity of the hydrophilic polyolefin sintered material in the present invention is not particularly limited as far as the average porosity is in the range of 20% to 80% by volume. In order to secure enough amount of water absorption and strength as the hydrophilic polyolefin sintered material and sufficiently exhibit water-absorbing functions by capillary action, the average porosity is preferably in the range of 25% to 60% by volume, and particularly preferably in the range of 30% to 55% by volume. When the average porosity is less than 20% by volume, the amounts of water permeation and water absorption are small, and therefore it is sometimes substantially hard to exhibit water-absorbing functions as the hydrophilic porous sintered material. When the average porosity is more than 80% by volume, the strength as the sintered material is sometimes insufficient. It should be noted that pores in the sintered material may be entirely uniform or nonuniform.

The average pore diameter the hydrophilic polyolefin sintered material in the present invention is the value of the average flow diameter determined according to ASTM F 31686, using a sintered material obtained by sinter-molding into a plate shape or obtained by sinter-molding and thereafter cutting out into a plate shape. The average pore diameter of the hydrophilic polyolefin sintered material in present invention is not particularly limited as far as the average pore diameter is in the range of 1 to 150 μm. In order to secure enough amount of water absorption and strength as the hydrophilic polyolefin sintered material and sufficiently exhibit water-absorbing functions by capillary action, the average pore diameter is preferably in the range of 3 to 120 μm, and particularly preferably in the range of 5 to 100 μm. When the average pore diameter is less than 1 μm, the sintered material is too dense, so that the sufficient amount of water absorption is sometimes not secured. When the average pore diameter is more than 150 μm, the continuous pore of the sintered material is coarse, and the water suction by capillary action is reduced, so that the water-absorbing functions are sometimes not sufficiently exhibited. It should be noted that mostly same average pore diameter is obtained also from the determination result according to the mercury intrusion method.

The hydrophilic ethylenically unsaturated group-containing monomer in the present invention refers to a monomer uniformly dissolving upon mixing 0.5% by weight with pure water at 25° C. under atmospheric pressure and having an ethylenically unsaturated group, i.e., polymerizable double bond for causing graft reaction. In addition, a compound having at least one or more polymerizable double bond may be used, and either a compound that polymerizes itself to be a macromer or a compound that does not form a homopolymer itself may be used. Furthermore, the above ethylenically unsaturated group-containing monomers can be used alone or in admixture of two or more kinds.

The hydrophilicity of the ethylenically unsaturated group-containing monomer in the present invention is a property derived from a hydrophilic functional group. Therefore, it is preferred that the ethylenically unsaturated group-containing monomers have at least one functional group selected from a phosphorylcholine group, a hydroxyl group, a carboxyl group, an amino group, an amide group, an alkoxy group, a sulfo group or salts thereof.

The ethylenically unsaturated group-containing monomers having a phosphorylcholine group in the present invention is an ethylenically unsaturated group-containing monomer having a phospholipid analog structure represented by:

[Formula 2]

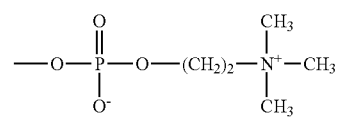

Since the phosphorylcholine group has the same chemical structure as a polar group of lipids constituting the cell membrane, it has excellent hydrophilicity and shows good biocompatibility. Therefore, the ethylenically unsaturated group-containing monomers having a phosphorylcholine group have little interaction with the biological components and are very useful for uses that safety for living material is desired, for example, uses in medical care, pharmaceutical products, foods or the like.

The ethylenically unsaturated group-containing monomers having a phosphorylcholine group in the present invention include, for example, methacryloyloxyalkyl phosphorylcholines and acryloyloxyalkyl phosphorylcholines such as 2-methacryloyloxyethyl phosphorylcholine, 2-acryloyloxyethyl phosphorylcholine, methacryloyloxypropyl phosphorylcholine, acryloyloxypropyl phosphorylcholine, 4-methacryloyloxybutyl phosphorylcholine, acryoyloxybutyl phosphorylcholine, 5-methacryloyloxypentyl phosphorylcholine, acryloyloxypentyl phosphorylcholine, 6-methacryloyloxyhexyl phosphorylcholine, 6-acryloyloxyhexyl phosphorylcholine, methacryloyloxyheptyl phosphorylcholine, 7-acryloyloxyhetyl phosphorylcholine, 8-methacryloyloxyoctyl phosphorylcholine, 8-acryloyloxyoctyl phosphorylcholine, 9-methacryloyloxynonyl phosphorylcholine, 9-acryloyloxynonyl phosphorylcholine, 10-methacryloyloxydecyl phosphorylcholine, 10-acryloyloxydecyl phosphorylcholine, 2-methacryloyloxypropyl phosphorylcholine, 2-acryloyloxypropyl phosphorylcholine, 2-methacrylcyloxyethoxyethyl phosphorylcholine, 2-acryloyloxyethoxyethyl phosphorylcholine, 2-methacryloyloxydiethoxyethyl phosphorylcholine, 2-acryloyloxydiethoxyethyl phosphorylcholine, 2-methacryloyloxytriethoxyethyl phosphorylcholine, 2-acryloyloxytriethoxyethyl phosphorylcholine, 2-methacryloyloxytetraethoxyethyl phosphorylcholine, 2-acryloyloxytetraethoxyethyl phosphorylcholine, 2-methacryloyloxypentaethoxyethyl phosphorylcholine, 2-acryloyloxypentaethoxyethyl phosphorylcholine, 2-methacryloyloxyhexaethoxyethyl phosphorylcholine, 2-acryoyloxyhexaethoxyethyl phosphorylcholine, 2-methacryloyloxyheptaethoxyethyl phosphorylcholine, 2-acryloyloxyheptaethoxyethyl phosphorylcholine, 2-methacryloyloxyoctaethoxyethyl phosphorylcholine, 2-acryloyloxyoctaethoxyethyl phosphorylcholine, 2-methacryloyloxynonaethoxyethyl phosphorylcholine, 2-acryloyloxynonaethoxyethyl phosphorylcholine, vinyl phosphorylcholine, allyl phosphorylpholine, butenyl phosphorylcholine, pentenyl phosphorylcholine, hexenyl phosphorylcholine, heptenyl phosphorylcholine, octenyl phosphorylcholine, nonenyl phosphorylcholine, decenyl phosphorylcholine, ω-methacryloyloxyethylene phosphorylcholine, ω-acryloyloxyethylene phosphorylcholine, ω-methacryloylpolyoxyethylene phosphorylcholine, ω-acryloylpolyoxyethylene phosphorylcholine, 2-acrylamide ethyl phosphorylcholine, 3-acrylamide propyl phosphorylcholine, 4-acrylamide butyl phosphorylcholine, 5-acrylamide pentyl phosphorylcholine, 6-acrylamide hexyl phosphorylcholine, 7-acrylamide heptyl phosphorylcholine, 8-acrylamide octyl phosphorylcholine, 9-acrylamide nonyl phosphorylcholine, 10-acrylamide decyl phosphorylcholine, ω-methacrylamide polyoxyethylene phosphorylcholine, ω-acrylamide polyoxyethylene phosphorylcholine, 2-(p-styryloxy)ethyl phosphorylcholine, 4-(p-styryloxy)butyl phosphorylcholine, 2-(p-styryl)phosphorylcholine, 2-(p-styrylmethyl)phosphorylcholine, 2-(p-vinylbenzyloxy)ethyl phosphorylcholine, 2-(p-vinylbenzyl)ethyl phosphorylcholine, 2-(vinylbenzoyloxy)ethyl phosphorylcholine, 2-(vinyloxycarbonyl)ethyl phosphorylcholine, 2-(allyloxycarbonyl)ethyl phosphorylcholine, and the like. The methacryloyloxyalkyl phosphorylcholine or acryloyloxyalkyl phosphorylcholine represented by the following general formula (1):

[Formula 3]

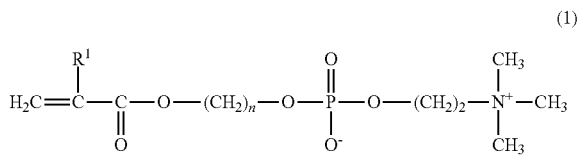

(1)

wherein, $R^1$ is a hydrogen atom or a methyl group, and n is an integer number of 2 to 10 is preferable, and 2-methacryloyloxyethyl phosphorylcholine is particularly preferable.

In addition, the hydrophilic ethylenically unsaturated group-containing monomers in the present invention include, for example, monomers having a hydroxyl group, such as 2-hydroxyethyl acrylate, 2-hydroxyethyl methacrylate, 2-hydroxypropyl acrylate, 1-hydroxy-2-propyl acrylate, 2-hydroxypropyl methacrylate, 1-hydroxy-2-propyl methacrylate, hydroxybutyl acrylate, hydroxybutyl methacrylate, glycerol monomethacrylate, glycerol dimethacrylate, 2-hydroxy-3-acryloyloxypropyl methacrylate, various fatty acid-denatured glycidyl methacrylates, polyethylene glycol monoacrylate, polyethylene glycol monomethacrylate, polypropylene glycol monoacryl polypropylene glycol monomethacrylate, polyethylene glycol-polypropylene glycol monoacrylate, polyethylene glycol-polypropylene glycol monomethacrylate, polyethylene glycol-tetramethylene glycol) monoacrylate, poly(ethylene glycol-tetramethylene glycol) monomethacrylate, poly(propylene glycol-tetramethylene glycol) monoacrylate, poly(propylene glycol-tetramethylene glycol) monomethacrylate, 3-(1,1,2,2-tetrafluoroethoxy)-2-hydroxypropyl methacrylate and allyl alcohol, monomers having a carboxyl group, such as acrylic acid, methacrylic acid, maleic acid, fumaric acid, itaconic acid, citraconic acid and mesaconic acid, monomers having an amino group, such as 2-vinylpyridine, 4-vinylpyridine, 2-dimethylaminoethyl acrylate, 2-dimethylaminoethyl methacrylate, 2-diethylaminoethyl acrylate and 2-diethylaminoethyl methacrylate, monomers having an amide group, such as acrylamide, methacrylamide, N,N-dimethylacrylamide, N,N-diethylacrylamide, N-methylacrylamide, methylenebisacrylamide, diacetone acrylamide, N-vinylacetamide, N-methyl-N-vinylacetamide and N-vinylpyrrolidone, monomers having an alkoxy group, such as methoxymethyl acrylate, methoxyethyl acrylate, methoxypropyl acrylate, methoxybutyl acrylate, ethoxymethyl acrylate, ethoxyethyl acrylate, ethoxypropyl acrylate, ethoxybutyl acrylate, (2-ethoxyethoxy)methyl acrylate, diethyleneglycol monoethylether acrylate, 3-(2-ethoxyethoxy)propyl acrylate, 4-(2-ethoxyethoxy)butyl acrylate, (2-methoxyethoxy)methyl acrylate, diethyleneglycol monomethylether acrylate, 3-(2-methoxyethoxy)propyl acrylate, 4-(2-methoxyethoxy)butyl acrylate, dimethyleneglycol monoethylether acrylate, 2-(ethoxymethoxy)ethyl acrylate, 3-(ethoxymethoxy)propyl acrylate, 4-(ethoxymethoxy)butyl acrylate, dimethyleneglycol monomethylether acrylate, 2-(methoxymethoxy)ethyl acrylate, 3-(methoxymethoxy)propyl acrylate and 4-(methoxymethoxy)butyl acrylate, methoxymethyl methacrylate, methoxyethyl methacrylate, methoxypropyl methacrylate, methoxybutyl methacrylate, ethoxymethyl methacrylate, ethoxyethyl methacrylate, ethoxypropyl methacrylate, ethoxybutyl methacrylate, (2-ethoxyethoxy)methyl methacrylate, diethyleneglycol monoethylether methacrylate, 3-(2-ethoxyethoxy)propyl methacrylate, 4-(2-ethoxyethoxy)butyl methacrylate, (2-methoxyethoxy)methyl methacrylate, diethyleneglycol monomethylether methacrylate, 3-(2-methoxyethoxy)propyl methacrylate, 4-(2-methoxyethoxy)butyl methacrylate, dimethyleneglycol monoethylether methacrylate, 2-(ethoxymethoxy)ethyl methacrylate, 3-(ethoxymethoxy)propyl methacrylate, 4-(ethoxymethoxy)butyl methacrylate, dimethyleneglycol monomethylether methacrylate, 2-(methoxymethoxy)ethyl methacrylate, 3-(methoxymethoxy)propyl methacrylate and 4-(methoxymethoxy)butyl methacrylate, monomers having a sulfo group or salts thereof, such as vinyl sulfonic acid, styrene sulfonic acid, sodium vinyl sulfonate, sodium styrene sulfonate, lithium styrene sulfonate and ammonium styrene sulfonate, and the like.

In addition, monomers having an epoxy group such as glycidyl acrylate, glycidyl methacrylate, glycidyl sorbate, glycidyl metaitaconate, ethylglycidyl maleate and glycidyl vinyl sulfonate, fatty acid vinyl esters such as vinyl acetate and vinyl versatate, esters of acrylic acid or methacrylic acid, such as methyl acrylate, ethyl acrylate, n-propyl acrylate, n-butyl acrylate, tert-butyl acrylate, cyclopentyl acrylate, cyclohexyl acrylate, n-stearyl acrylate, methyl methacrylate, ethyl methacrylate, n-propyl methacrylate, n-butyl methacrylate, tert-butyl methacrylate, cyclopentyl methacrylate, cyclohexyl methacrylate and n-stearyl methacrylate, halides of acrylic acid or methacrylic acid, such as acrylyl chloride, acrylyl bromide, methacrylyl chloride and methacrylyl bromide, unsaturated aldehydes such as acrolein, and the like may be used, and after grafting, the active functional group contained in those monomers may be substituted with a hydrophilic functional group.

The hydrophilic polyolefin sintered material the present invention may be obtained by, after sinter-molding the polyolefin resin particles, grafting at least one molecular chain selected from the hydrophilic ethylenically unsaturated group-containing monomers and polymers thereof or may be obtained by previously grafting at least one molecular chain selected from the hydrophilic ethylenically unsaturated group-containing monomers and polymers thereof onto the polyolefin resin particles and thereafter sinter-molding the particles.

It should be noted that in the case of previously grafting onto the polyolefin resin particles and thereafter sinter-molding the particles, in order to increase welding force, polyolefin resin particles that are not grafted may be mixed and then sinter-molded.

In the present invention, mixing of the grafted polyolefin resin particles with the polyolefin resin particles that are not grafted can be carried out using a Henschel mixer, a tumbler mixer, a ladies mixer, a high-speed flow-type mixer, a V-shape mixer or the like, and the apparatus, the mixing conditions and the like are preferably selected so that no charge builds up on the particles during mixing. When the particles take a charge, the particles are likely to generate agglomeration among particles and it is sometimes difficult to uniformly mix the particles. It is preferred to eliminate static electricity upon carrying the particles by a ground wire, a blowing type static eliminator or the like.

The mixing ratio of the grafted polyolefin resin particles to the polyolefin resin particles that are not grafted is not particularly limited. In order to satisfy both strength and water-absorbing functions as the hydrophilic polyolefin sintered material, the ratio of the former is preferably in the range of 10% to 70% by weight, and particularly preferably in the range of 30% to 60% by weight.

In the present invention, the method of grafting at least one molecular chain selected from the hydrophilic ethylenically unsaturated group-containing monomers and polymers thereof is not particularly limited as far as the method can introduce the hydrophilic ethylenically unsaturated group-containing monomers using the radicals generated by polyolefin as starting points. The method includes, for example, a method according to plasma generated by corona discharge or glow discharge, a method according to active gas represented by ozone, a method according to a photosensitizer such as benzophenone and acetophenone and an active light such as ultraviolet light, a method according to ionizing radiation, a method according to various radial initiators, and the like. A method of producing radicals by irradiation of an active light ionizing radiation is preferable since it is excellent in uniformity.

It should be noted that the ionizing radiation in the present invention refers to a radiation that can cause ionization acting with a substance and includes, for example, γ-ray, X-ray, β-ray, electron ray, α-ray and the like. γ-ray that is suitable for industrial production and can particularly uniformly produce radicals is preferable.

The exposure dose of ionizing radiation in the present invention is not particularly limited as far as it is an economically preferred exposure dose which can give a sufficient amount of radicals for grafting and does not cause unnecessary crosslinking or partial decomposition. Since radicals are uniformly produced and effects on rigidity and chemical-resistance of the sintered material is less, the exposure dose is preferably in the range of 1 kGy to 1,000 kGy, more preferably in the range of 5 kGy to 500 kGy, and particularly preferably in the range of 10 kGy to 300 kGy.

In the present invention, the method of delivering ionizing radiation is roughly classified into a simultaneous irradiation method which comprises delivering ionizing radiation in the coexistence of the polyolefin resin particles or the sintered material thereof and the hydrophilic ethylenically unsaturated group-containing monomers, and a pre-irradiation method which comprises previously delivering ionizing radiation to the polyolefin resin particles or the sintered material thereof and then contacting the particles or sintered material with the hydrophilic ethylenically unsaturated group-containing monomers. The method is not particularly limited, but the pre-irradiation method is preferred since the production of a homopolymer of the monomer is less.

In the present invention, contacting of the polyolefin resin particles or the sintered material thereof in which radicals are produced with the hydrophilic ethylenically unsaturated group-containing monomers can be carried out either in gas phase or liquid phase. The method is not particularly limited, but a method carried out in a liquid phase in which grafting can be carried out more uniformly is preferred. In addition, in order to increase uniformity, it is preferred to previously dissolve the hydrophilic ethylenically unsaturated group-containing monomers into a solvent and then use the solution. Furthermore, it is preferred that the liquid phase is a liquid phase from which dissolved oxygen is removed. Dissolved oxygen is removed from a liquid phase, whereby the liquid phase can be effectively utilized without carelessly depriving the polymerization activity of radicals, and the hydrophilization of a polyolefin sintered material surprisingly uniformly progresses.

The method of removing dissolved oxygen in the present invention is not particularly limited and includes a method of degassing using a vacuum pump, a method eating an operation of freezing a liquid phase with liquid nitrogen and then degassing using a vacuum pump and thawing, a method of using a liquid phase subjected to distillation under reduced pressure as it is, a method of deoxidizing a liquid phase by ultrasonic irradiation, a method of bubbling inert gas into a liquid phase, and the like. A method of bubbling inert gas into a liquid phase is preferable.

In the present invention, an inert gas upon bubbling is not particularly limited as far as the inert gas does not inhibit a graft reaction, and the generally known inert gas such as nitrogen, argon, helium and neon can be used.

In the present invention, the flow rate of the inert gas upon bubbling is not particularly limited, and a flow rate of 5% to 500% by volume per minute is preferable, a flow rate of 10% to 300% by volume per minute is more preferable, and a flow rate of 50% to 200% by volume per minute is particularly preferable, based on the volume of a vessel of the liquid phase.

In the present invention, the introduction amount of the inert gas upon bubbling is not particularly limited, and the introduction amount of the inert gas before initiation of graft reaction is preferably 1 to 500 times, more preferably 2 to 400 times, and particularly preferably 5 to 300 times, the volume of a vessel the liquid phase. It should be noted that bubbling with an inert gas can be continued upon grafting.

The bubbling method in the present invention is not particularly limited, and the bubbling may be carried out from an inlet port of inert gas immersed in a liquid phase, and the bubbling may be carried out by dissolving an inert gas into a liquid phase under pressure and then reducing pressure to produce bubbles. Either method may be used, and a method of carrying out bubbling from an inlet port of inert gas immersed in a liquid phase is preferable. In addition, it is preferred that the inlet port of inert gas immersed in a liquid phase has a structure comprising plural micropores. Furthermore, the pore diameter is preferably in the range 0.1 µm to 10 mm, more preferably in the range of 1 µm to 5 mm, and particularly preferably in the range of 5 µm to 2 mm. The inlet port of inert gas immersed in a liquid phase has a structure comprising plural micropores, thereby generating more bubbles, and therefore it has an effect to accelerate the removal of dissolved oxygen. It should be noted that it is preferred to stir the liquid phase so as to disperse bubbles of inert gas throughout the liquid phase.

In the present invention, the solvent for dissolving the hydrophilic ethylenically unsaturated group-containing monomers is not particularly limited as far as the solvent is capable of uniformly dissolving. It is preferred to use a solvent having the small swelling degree of polyolefin resin. Specifically, a solvent which has a swelling degree of 10% or less is preferred and includes, for example, alcohols such as methanol, ethanol, isopropanol and tert-butanol, ethers such as diethylether and tetrahydrofuran, ketones such as acetone and 2-butanone, water, mixture thereof, and the like.

The swelling degree in the present invention is a value obtained by dividing the difference between the average particle diameter of polyolefin resin particles immersed in a solvent for 1 hour and the average particle diameter of polyolefin resin particle before the immersion by the average particle diameter of polyolefin resin particles before the immersion.

The sintered material polyolefin resin particles in which radicals are produced by pre-irradiation method of the present invention is preferably degassed in the reaction vessel before contacting the sintered material with the hydrophilic ethylenically unsaturated group-containing monomers. The hydrophilic ethylenically unsaturated group-containing monomers are introduced into the degassed reaction vessel by aspiration, whereby grafting can be uniformly carried out even in the internal of pores in the sintered material. The degree of vacuum in the reaction vessel upon degassing is preferably in the range of 0 to 1,340 Pa, more preferably in the range of 0 to 134 Pa, and particularly preferably in the range of 0 to 13.4 Pa.

The temperature upon delivering ionizing radiation in the present invention is not particularly limited. Since denaturation of the produced radicals is suppressed, the temperature is preferably in the range of −150 to 0° C., and particularly preferably in the range of −100 to −30° C. It should be noted that after radicals are produced by a pre-irradiation method of the present invention, the sintered material is preferably kept at a low temperature of −10° C. or less until contacting the sintered material with the hydrophilic ethylenically unsaturated group-containing monomers. When the sintered material is not kept at low temperature, the radicals rapidly decay. For example, after 30 minutes at a room temperature of 25° C., surprisingly, the number of radicals is reduced by half. Furthermore, radicals sometimes react with a very small amount of adsorbed oxygen to impair heat-resistance and chemical-resistance of the sintered material.

In the present invention, the temperature upon grafting is not particularly limited as far as the temperature is less than the melting point of the polyolefin resin particles and is preferably in the range of 0 to 100° C., more preferably in the range of 5 to 90° C., and particularly preferably in the range of 10 to 80° C. When the temperature upon grafting is less than 0° C., the reaction rate is low, and the reaction sometimes ununiformly progresses. When the temperature upon grafting is more than 100° C., a homopolymer of monomers is produced, and pores in the sintered material are sometimes blocked, and further the homopolymer may flow out during use.

In the present invention, when the polyolefin resin particles in which radicals are produced or the sintered material thereof are contacted with the hydrophilic ethylenically unsaturated group-containing monomers in a liquid phase, the concentration of a liquid phase of the hydrophilic ethylenically unsaturated group-containing monomers is not particularly limited. In order to obtain sufficient hydrophilicity without blocking pores in hydrophilic polyolefin sintered material, in the case of ethylenically unsaturated group-containing monomers in the form of liquid at 25° C. under atmospheric pressure, the concentration is preferably in the range of 0.3% to 30% by volume, more preferably in the range of 0.5% to 20% by volume, and particularly preferably in the range of 0.8% to 15% by volume. In addition, in the case of ethylenically unsaturated group-containing monomers in the form of solid at 25° C. under atmospheric pressure, the concentration is preferably in the range of 0.1% to 25% by weight, more preferably in the range of 0.2% to 20% by weight, and particularly preferably in the range of 0.3% to 15% by weight.

It should be noted that the amount of the liquid phase is not particularly limited, but the liquid phase is preferably used in a rate of $2\times10^{-6}$ to $5\times10^{-3}$ m$^3$ and particularly preferably used in a rate of $3\times10^{-6}$ to $2\times10^{-3}$ m$^3$, based on 1 g of the polyolefin resin particles or the sintered material thereof, from the viewpoint of industrial production.

In the present invention, while practical permeation property of the porous sintered material comprising polyolefin resin particles is maintained, the ethylenically unsaturated group-containing monomers or polymers thereof in an amount sufficient for exhibiting water-absorbing functions are grafted. Therefore, the graft ratio is preferably in the range of 0.01% to 50%, more preferably in the range of 0.05% to 40%, and particularly preferably in the range of 0.10% to 30%. It should be noted that the graft ratio in the present invention is the value calculated according to the following formula.

Graft Ratio(%)=[(Weight after Grafting−Weight Before Grafting)/Weight Before Grafting]×100

It should be noted that when polyolefin resin particles that are not grafted are mixed and then sinter-molded in order to increase welding force, a denominator "Weight Before Grafting" in the above formula is defined as the total weight of polyolefin resin particles also comprising polyolefin resin particles that are not grafted.

The drop absorption time in the present invention refers to the time required from dropping a drop having 35 µl from a position of 20 mm height onto the middle of a sintered material of 50 mm length, 50 mm width and 2 mm thickness horizontally placed at 25° C. under atmospheric pressure until the whole amount is absorbed into the sintered material. The drop absorption time in the present invention is not particularly limited as far as the time is 60 seconds or less that is the condition for determining water-absorbing functions. In order to sufficiently exhibit water-absorbing functions as the hydrophilic polyolefin sintered material, the drop absorption time is preferably 30 seconds or less, more preferably 10 seconds or less, and particularly preferably 5 seconds or less.

In addition, the water suction height in the present invention is the value obtained by vertically immersing a 20 mm bottom part of a sintered material of 2 mm thickness, 10 mm width and 100 mm height in 25° C. water at 25° C. under atmospheric pressure and determining minimum value X of water suction distance by capillary action 1 minute after immersion. The water suction height in the present invention is not particularly limited, and in order to sufficiently exhibit water-absorbing functions as the hydrophilic polyolefin sintered material, the water suction height is preferably 5 mm or more, more preferably 10 mm or more, and particularly preferably 15 mm or more per minute. It should be noted that the ratio of maximum value Y to minimum value X of water suction height, i.e., Y/X, shows the uniformity of water-absorbing functions, and is preferably in the range of 1.0 to 2.0 times, more preferably from 1.0 to 1.5 times, and particularly preferably from 1.0 to 1.2 times per minute.

In order to confirm the sustainability of water-absorbing functions that is suggested as the feature of the hydrophilic polyolefin sintered material in the present invention, for example, the water absorption time and water suction height after removing a 60° C. hot water-soluble component may be determined. Here, a method of removing a 60° C. hot water-soluble component will be explained. First, a sintered material to be determined is immersed for 7 hours in a 60° C. hot water circulating tank equipped with a unit type constant-temperature bath. Thereafter, water remained in pores in the sintered material is removed, and the sintered material is dried. The above operations are repeated for a total of 3 times, thereby removing a 60° C. hot water-soluble component. When the hydrophilic polyolefin sintered material is obtained by coating a 60° C. hot water-soluble component such as a surfactant or water-soluble hydrophilic polymer, water-absorbing functions are lost due to this removal method.

The drop absorption time after removing a 60° C. hot water-soluble component in the present invention is not particularly limited. In order to sufficiently exhibit water-absorbing functions as the hydrophilic polyolefin sintered material, the drop absorption time is preferably 30 seconds or less, more preferably 10 seconds or less, and particularly preferably 5 seconds or less.

The water suction height after removing a 60° C. hot water-soluble component in the present invention is not particularly limited. In order to sufficiently exhibit water-absorbing functions as the hydrophilic polyolefin sintered material, the water suction height is preferably 5 mm or more, more preferably 10 mm or more, and particularly preferably 15 mm or more per minute.

The ratio of maximum value Y to minimum value X of water suction height after removing a 60° C. hot water-soluble component in the present invention, i.e., Y/X, is not particularly limited. In order to sufficiently exhibit water-absorbing functions as the hydrophilic polyolefin sintered material, the ratio is preferably in the range of 1.0 to 2.0 times, more preferably from 1.0 to 1.5 times, and particularly preferably from 1.0 to 1.2 times per minute.

The representative method for evaluating the uniformity of the grafted amount in the cross-section direction of the hydrophilic polyolefin sintered material includes, for example, a line analysis according to the microscope ATR method. First, the hydrophilic polyolefin sintered material is embedded in an epoxy resin, and a section is prepared by slicing using a microtome. Using Spectrum Spotlight 300 (trade name) manufactured by PerkinElmer Inc., the section is scanned using an aperture size of 10 μm×100 μm, a step size of 10 μm, a resolution of 4 cm$^{-3}$, an accumulation number of 100 and a wavenumber range of 4,000 to 700 cm$^{-3}$, to confirm an absorption peak derived from the hydrophilic ethylenically unsaturated group-containing monomers. When an acrylic acid derivative, methacrylic acid derivative or the like is used as the hydrophilic ethylenically unsaturated group-containing monomers, the uniformity of the grafted amount in the cross section direction can be evaluated using an intensity ratio of an absorption peak of 1,780 cm$^{-3}$ derived from a carbonyl group to an absorption peak of 1,460 cm$^{-3}$ derived from a methylene chain. When a sulfonic acid derivative is used, an absorption peak of 1,060 to 1,030 cm$^{-1}$ derived from S=O stretching vibration may be used. In addition, focusing on a specific element derived from the hydrophilic ethylenically unsaturated group-containing monomers, the uniformity can be evaluated as well by carrying out elemental analysis according to X-ray photoelectron spectroscopy. The evaluation method is not limited to these methods, and every method can be used.

It is desired that water used in the present invention is any water of filtered, distilled, reverse osmosis and ion-exchange, or a pure water having a resistivity of 50,000 Ω·cm or more obtained by removing impurities, metal ions and the like by the combination of above water.

The hydrophilic polyolefin sintered material obtained according to the present invention can be utilized as general industrial members, as well as in life science field such as a support for a rapid test kit according to immunochromatography, a filter for apheresis treatment, filters for dialysis and the like, various implants, prefilters of bioanalysis kit and the like, supports for low rigid filter and the like and a support for ion exchange resin, and in electronics field such as ink absorber for printer head, a support for solid electrolyte and a member for fuel cells.

Next, the present invention will be described based on Examples and Comparative Examples, and the present invention is not limited thereto.

EXAMPLES

Preparation of Sintered Material

The preparation of the sintered materials in Examples and Comparative Examples of the present invention was carried out according to the following method. First, using an aluminum plate with 2 mm thickness, a mold with outer dimensions of 6 mm thickness, 112 mm width and 108 mm height and with inside dimensions of 2 mm thickness, 100 mm width and 100 mm height was prepared. An aluminum plate, that is a top cover of the mold, was uncovered, and polyolefin resin particles were packed while vibrating with a vibrator for 30 seconds. The top cover was brought back, and then the mold was heated for 25 minutes in an oven at 150° C. give a plate-shaped sintered material.

Determination of Average Porosity

The average porosity in Examples and Comparative Examples of the present invention was calculated according to the following formula.

$$\text{Average Porosity(\% by Volume)} = [(\text{True Density} - \text{Apparent Density})/\text{True Density}] \times 100$$

Here, the true density (g/cm$^3$) refers to the density of the polyolefin resin particles, and the apparent density (g/cm$^3$) refers to the value obtained by dividing the weight of the sintered material by the volume calculated from the outer dimensions of the sintered material.

Determination of Average Pore Diameter

The average pore diameter in Examples and Comparative Examples of the present invention was obtained using a pore size meter PSM165 (trade name) manufactured by Yuasa-Ionics Company, Limited and an automated porosimeter AutoPore IV9510 (trade name) manufactured by Shimadzu Corporation. The determination conditions of the automated porosimeter were set as a measurement range in the low-pressure section of 0.54 to 40 psia, the number of measurement points in the low-pressure section of 46, a measurement range in the high-pressure section of 50 to 6,000 psia, and the number of measurement points in the high-pressure section of 43.

Removal of 60° C. Hot Water-Soluble Component

The removal of a 60° C. hot water-soluble component in Examples and Comparative Examples of the present invention was carried out according to the following method. First, a polypropylene water bath having an inner volume of 335 mm length, 190 mm width and 155 mm depth equipped with Thermominder SH-12 (trade name) manufactured by TAITEC CORPORATION was charged with 8,000 cm$^3$ of water and was set at a temperature of 60° C., and a sintered material to be determined was immersed for 7 hours in this hot water circulating tank. Thereafter, water remained in pores in the sintered material was removed, and the sintered material was dried. The above operations were repeated for a total of 3 times, thereby removing a 60° C. hot water-soluble component. It should be noted that as water in Examples and Comparative Examples of the present invention, ion exchange water (manufactured by Okayama Kisui Kogyo Y.K., a resistivity upon sampling water of 2,000,000 Ω·cm or more) was used.

Determination of Drop Absorption Time

The drop absorption time in Examples and Comparative Examples of the present invention was obtained by determining the time required from when dropping a drop having 35 μl from a position of 20 mm height onto the middle of a sintered material of 50 mm length, 50 mm width and 2 mm thickness horizontally placed at 25° C. under atmospheric pressure using a micropipette manufactured by Eppendorf Co., Ltd., to when the whole amount was absorbed into the sintered material.

Determination of Water Suction Height

The water suction height in Examples and Comparative Examples of the present invention was obtained by vertically immersing a 20 mm bottom part of a sintered material of 2 mm thickness, 10 mm width and 100 mm height in water at 25° C. under atmospheric pressure and determining minimum value X of the distance of water suction by capillary action at 1 minute after immersion.

Calculation of Ratio of Maximum Value Minimum Value X of Water Suction Height, i.e., Y/X The ratio of maximum value Y to minimum value X of water suction height, i.e., Y/X, in Examples and Comparative Examples of the present invention was obtained by vertically immersing 20 mm bottom part of a sintered material of 2 mm thickness, 10 mm width and 100 mm height in water at 25° C. under atmospheric pressure, determining minimum value X and maximum value Y of the distance of water suction by capillary action at 1 minute after immersion, and calculating the ratio of maximum value Y to minimum value X, i.e., Y/X.

It should be noted that the hydrophilic polyolefin sintered materials obtained in Examples of the present invention had Y/X all in the range of 1.0 to 1.5 times. Furthermore, even after removing a 60° C. hot water-soluble component, the sintered materials had Y/X all in the range of 1.0 to 1.5 times.

Determination of Average Particle Diameter

The average particle diameter of the polyolefin resin particles in the present invention is the particle diameter where the cumulative weight is 50%, i.e., median diameter.

The average particle diameter of the polyolefin resin particles in Examples and Comparative Examples of the present invention was obtained by determination with methanol as a dispersion medium using a SALD-2100 (trade name) manufactured by Shimadzu Corporation. In addition, the cumulative weight of the particles having a particle diameter in the range of 1 to 500 μm was calculated, and whether or not the cumulative weight was 90% by weight or more of the whole determined particles was determined.

Determination of Bulk Density

The bulk density of the polyolefin resin particles in Examples and Comparative Examples of the present invention was obtained by measurement according to JIS K 6892 without adding an additive such as lubricant to the polyolefin resin particles.

Determination of Density

The density of the polyolefin resin particles in Examples and Comparative Examples of the present invention was obtained by determination according to JIS K 7112 using a substance obtained by annealing a section cut out from a press sheet of polyolefin resin particles at 120° C. hour and thereafter cooling the annealed section at 25° C. for 1 hour as a sample for determining density. It should be noted that the press sheet of polyolefin resin particles was prepared according to ASTM D 1928 Procedure C using a mold 60 mm length, 60 mm width and 2 mm thickness.

Determination of Viscosity Average Molecular Weight

The viscosity average molecular weight of the polyolefin resin particles in Examples and Comparative Examples of the present invention was obtained by the method shown below. First, to 20 cm$^3$ of decalin (decahydronaphthalene) was added 10 mg of a polymer, and the mixture was stirred at 150° C. for 2 hours to dissolve the polymer. The time taken by the solution to travel between the marked lines ($t_s$) was determined in a constant-temperature bath at 135° C. using an Ubbelohde type viscometer. The time in the case of adding 5 mg of a polymer was determined as well. As a blank, the time taken by the solution of only decalin without a polymer to travel ($t_b$) was determined. The specific viscosity of a polymer ($\eta_{sp}/C$) obtained according to the following formula was each plotted, and a linear formula of the concentration (C) and the specific viscosity of a polymer ($\eta_{sp}/C$) was delivered, to give the intrinsic viscosity extrapolated to zero concentration (η).

$$\eta_{sp}/C=(t_s/t_b-1)/0.1$$

The viscosity average molecular weight (Mv) was obtained from the intrinsic viscosity (η) according to the following formula, $$Mv=5.34\times10^4\eta^{3.49}$$

Line Analysis According to Microscope ATR Method

The uniformity of the grafted amount in Examples and Comparative Examples of the present invention was evaluated by a line analysis according to the microscope ATR method. First, the resulting plate-shaped sintered material was cut out into a size of 5 mm length, 5 mm width and 2 mm thickness and then embedded in an epoxy resin, and the center of the sintered material was sliced in thickness direction using a microtome, to prepare a section of the sintered material. According to the same operations, a total of 10 evaluation samples were prepared. Using Spectrum Spotlight 300 (trade name) manufactured by PerkinElmer Inc., the section was scanned using an aperture size of 10 μm×100 μm, a step size of 10 μm, a resolution of 4 cm$^{-1}$, an accumulation number of 100 and a wavenumber range of 4,000 to 700 cm$^{-1}$. In Examples 1 to 10, Examples 13 to 18 and Comparative Example 5, the intensity ratio of an absorption peak of 1,780 cm$^{-1}$ derived from a carbonyl group to an absorption peak of 1,460 cm$^{-1}$ derived from a methylene chain was evaluated, to obtain the ratio of the average value of the intensity ratio in the vicinity of surface of the sintered material (A) and the average value of the intensity ratio in the central layer of the sintered material (B), i.e., B/A. In Examples 11 to 12 and Comparative Example 8, an absorption peak of 1,060 to 1,030 cm$^{-1}$ derived from S=O stretching vibration, not a carbonyl group, was used. It should be noted that the vicinity of surface of the sintered material in the present invention shows a region corresponding to 10% to 20% depth from the outer surface of the sintered material based on the thickness of the plate-shaped sintered material, and the control layer of the sintered material shows region corresponding to 45% to 55% depth from the outer surface of the sintered material based on the thickness of the plate-shaped sintered material. The above evaluation was each carried out for a total number of 10 evaluation samples, and it was determined that the sample having B/A all in the range of 0.5 to 2.0 has the uniformity of the grafted amount.

The hydrophilic polyolefin sintered materials obtained in Examples of the present invention were all determined as having the uniformity of the grafted amount. Furthermore, even after removing a 60° C. hot water-soluble component, the sintered materials were all determined as having the uniformity of the grafted amount. On the other hand, in Comparative Example 5 and Comparative Example 8, the hydrophilic polyolefin sintered materials were not determined as having the uniformity of the grafted amount. Also, even after removing a 60° C. hot water-soluble component, the sintered materials were not determined as having the uniformity of the grafted amount.

Example 1

A plate-shaped sintered material was prepared using an ultrahigh molecular weight high density polyethylene powder (SUNFINE (registered trademark) UH901 manufactured by Asahi Kasei Chemicals Corporation) having an average particle diameter of 163 μm, a cumulative weight of the particles having a particle diameter in the range of 1 to 500 μm of 90% by weight or more, a bulk density of 0.44 g/cm³, a density of 0.940 g/cm³ and a viscosity average molecular amount of 3,300,000. The sintered material was put in an aluminum evaporated polyethylene bag, and the bag was sealed with nitrogen gas and exposed to 200 kGy γ-ray while cooling to −60° C. with dry ice. A 25% by volume aqueous solution of tert-butanol (manufactured by Junsei Chemical Co., Ltd., JIS special grade) was mixed with hydroxypropyl acrylate (manufactured by Tokyo Chemical Industry Co., Ltd., mixture of 2-hydroxypropyl ester and 2-hydroxy-1-methylethyl ester, the content of 2-hydroxypropyl acrylate is 90% or more), to prepare a 14% by volume monomer solution, and dissolved oxygen was removed by bubbling nitrogen at 40° C. for 30 minutes. The sintered material after the exposure to γ-ray was charged in a reaction vessel and allowed to stand still under a reduced pressure of 13.4 Pa or less for 15 minutes, and then 1,200 cm³ of the above monomer solution was introduced, to react at 40° C. for 20 minutes. Thereafter, the reaction substance was washed by being immersed in 1,200 cm³ of a 50% by volume aqueous solution of 2-propanol (manufactured by Wako Pure Chemical Industries, Ltd., JIS special grade) at 25° C. for 20 minutes, and this washing operation was repeated for a total of 3 times, and thereafter the substance was dried, to obtain a hydrophilic porous sintered material with a graft ratio of 4.4%. The average porosity, the average pore diameter, the drop absorption time and the water suction height of the resulting hydrophilic porous sintered material are shown in Table 1. The hydrophilic porous sintered material showed excellent water absorbing functions even after removing a 60° C. hot water-soluble component.

Comparative Example 1

To 100 parts by weight of the ultrahigh molecular weight high density polyethylene powder used in Example 1 was added 0.3 parts by weight of polyoxyethylene sorbitan monolaurate, and the mixture was dry-mixed with a high-speed mixer while heated to 100° C. A plate-shaped sintered material was prepared using the resulting hydrophilic powder. The average porosity, the average pore diameter, the drop absorption time and the water suction height of the resulting hydrophilic porous sintered material are shown in Table 1. The water absorbing functions of the hydrophilic porous sintered material were completely lost by removing a 60° C. hot water-soluble component.

TABLE 1

| | Average Porosity (% by Volume) | Average Pore Diameter (μm) [1] | Average Pore Diameter (μm) [2] | Before Removal of 60° C. Hot Water-Soluble Component | | After Removal of 60° C. Hot Water-Soluble Component | |
|---|---|---|---|---|---|---|---|
| | | | | Drop Absorption Time (sec) | Water Suction Height (mm/min) | Drop Absorption Time (sec) | Water Suction Height (mm/min) |
| Example 1 | 41 | 24 | 26 | 1.5 | 37 | 1.2 | 41 |
| Comparative Example 1 | 42 | 25 | 26 | 0.7 | 42 | Undeterminable (Not Absorbed) | 0 |

[1] Determined by Pore Size Meter PSM165
[2] Determined by Automated Porosimeter Auto Pore IV9510

Example 2

The same procedures as Example 1 were carried out except that the time of the reaction of the sintered material after the exposure γ-ray with the monomer solution was 60 minutes, to obtain a hydrophilic porous sintered material with a graft ratio of 18.0%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 3

The amount 20 g of the ultrahigh molecular weight high density polyethylene powder used in Example 1 was put in an aluminum evaporated polyethylene bag, and the bag was sealed with nitrogen gas and exposed to 100 kGy γ-ray while cooling to −60° C. with dry ice. A 25% by volume aqueous solution of tert-butanol (manufactured by Junsei Chemical Co., Ltd., JIS special grade) was mixed with hydroxypropyl acrylate (manufactured by Tokyo Chemical industry Co., Ltd., mixture of 2-hydroxypropyl ester and 2-hydroxy-1-methylethyl ester, the content of 2-hydroxypropyl acrylate is 90% or more), to prepare 200 $cm^3$ of a 30% by volume monomer solution, and dissolved oxygen was removed by bubbling nitrogen at 40° C. for 30 minutes. In this monomer solution was charged the powder after the exposure to γ-ray under bubbling nitrogen, and the mixture was reacted at 40° C. for 180 minutes. Thereafter, the reaction slurry was filtrated with a Buchner funnel and washed by stirring in 1,200 $cm^3$ of 2-propanol (manufactured by Wako Pure Chemical Industries, Ltd., JIS special grade) and 1,200 $cm^3$ of ion exchange water respectively at 25° C. for 1 hour, and this washing operation was repeated for a total of 3 times, and thereafter the washed slurry was dried, to obtain a hydrophilic powder. A plate-shaped sintered material was prepared using a mixed powder of 100 parts by weight this hydrophilic powder and 100 parts by weight of the powder before hydrophilization. The graft ratio was 17.2%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 4

A plate-shaped sintered material was prepared using a high density polyethylene powder (SUNFINE, (registered trademark) SH821 manufactured by Asahi Kasei Chemicals Corporation) having an average diameter of 277 μm, a cumulative diameter of the particles having a particle diameter in the range of 1 to 500 μm of 90% by weight or more, a bulk density of 0.45 $g/cm^3$, a density of 0.955 $g/cm^3$ and a viscosity average molecular amount of 300,000. The above sintered material was immersed in a solution obtained by dissolving 1 g of benzophenone (manufactured by Sigma-Aldrich Japan K.K.) in 1,000 $cm^3$ of acetone for 1 minute under protection from light, and then the sintered material taken out was dried under reduced pressure for 1 hour in a condition protected from light. A 14% by volume aqueous solution of hydroxypropyl acrylate (manufactured by Tokyo Chemical Industry Co., Ltd., mixture of 2-hydroxypropyl ester and 2-hydroxy-1-methylethyl ester, the content of 2-hydroxypropyl acrylate is 90% or more) was prepared, and dissolved oxygen was removed by bubbling nitrogen at 40° C. for 30 minutes. The above sintered material treated with the acetone solution of benzophenone was immobilized on 1,200 $cm^3$ of the solution, adjusted to a temperature of 60° C. and exposed to ultraviolet light for 90 minutes using a high-pressure mercury lamp UVL-400HA (trade name) (manufactured by Riko Kagaku Sangyo K.K.). Thereafter, the reaction substance was washed by being immersed in 1,200 $cm^3$ of ion exchange water and 1,200 $cm^3$ or methanol (manufactured by Wake Pure Chemical Industries, Ltd., JIS special grade) respectively at 25° C. for 8 hours, and this washing operation was repeated for a total of 3 times, and thereafter the substance was dried, to obtain a hydrophilic porous sintered material with a graft ratio of 4.7%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 5

A plate-shaped sintered material was prepared using the ultrahigh molecular weight high density polyethylene powder used in Example 1. The sintered material was put in a polyethylene bag, and the bag was sealed with nitrogen gas and exposed to 200 kGy γ-ray while cooling to −60° C. with dry ice. A 25% by volume aqueous solution of tert-butanol (manufactured by Wako Pure Chemical Industries, Ltd., Wako special grade) was mixed with hydroxypropyl acrylate (manufactured by Wako Pure Chemical Industries, Ltd., isomeric mixture, the content of 2-hydroxypropyl acrylate is 90% or more), to prepare a 5% by volume monomer solution, and dissolved oxygen was removed by bubbling nitrogen at 40° C. for 120 minutes. The polyethylene bag in which the above sintered material was put was opened in a glove bag replaced with nitrogen gas, and 300 $cm^3$ of the above monomer solution was introduced thereinto. The bag was resealed, then set up on a constant-temperature shaking water bath and reacted at 40° C. for 60 minutes. Thereafter, the reaction substance was washed by being immersed in 1,200 $cm^3$ of a 50% by volume aqueous solution of methanol (manufactured by Wako Pure Chemical Industries, Ltd., JIS special grade) at 25° C. for 1 hour. This washing operation was repeated for a total of 3 times, and thereafter the washed substance was dried, to obtain a hydrophilic porous sintered material with a graft ratio of 2.6%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 6

The same procedures as Example 5 were carried out except that the temperature of bubbling nitrogen was 25° C., the temperature of the reaction of the sintered material after the exposure to γ-ray and the monomer solution was 25° C., and the reaction time was 120 minutes, to obtain a hydrophilic porous sintered material with a graft ratio of 3.8%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 7

The same procedures as Example 6 were carried out except that an ultrahigh molecular weight high density polyethylene powder (MIPELON (registered trademark) XM-220 manufactured by Mitsui Chemicals, Inc) having an average diameter of 42 μm, a cumulative diameter of the particles having a particle diameter in the range of 1 to 500 μm of 90% by weight or more, a bulk density 0.41 $g/cm^3$, a density 0.936 $g/cm^3$ and a viscosity average molecular amount of 2,710,000 was used, and the concentration of the monomer solution was 3% by volume, to obtain a hydrophilic porous sintered material with a graft ratio of 2.8%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 8

The same procedures as Example 6 were carried out except that an ultrahigh molecular weight high density polyethylene powder (GUR (registered trademark) 4120 manufactured by Ticona) having an average diameter of 143 μm, a cumulative weight of the particles having a particle diameter in the range of 1 to 500 μm of 90% by weight or more, a bulk density of 0.42 g/m$^3$, density of 0.930 g/cm$^3$ and a viscosity average molecular amount of 3,340,000 was used, and ethanol (manufactured by Wako Pure Chemical Industries, Ltd., JIS special grade) was used in place of tert-butanol, to obtain a hydrophilic porous sintered material with a graft ratio of 3.0%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 9

A plate-shaped sintered material was prepared using the ultrahigh molecular weight high density polyethylene powder used in Example 8. The sintered material was put in a polyethylene bag, and the bag was sealed with nitrogen gas and exposed to 100 kGy γ-ray while cooling to −60° C. with dry ice. A 25% by volume aqueous solution of tert-butanol (manufactured by Wako Pure Chemical Industries, Ltd., Wako special grade) was mixed with 2-hydroxyethyl methacrylate (manufactured by Wako Pure Chemical Industries, Ltd., Wako 1st grade), to prepare a 5% by volume monomer solution, and dissolved oxygen was removed by bubbling nitrogen at 25° C. for 120 minutes. The polyethylene bag in which the above sintered material was put was opened in a glove bag replaced with nitrogen gas, and 300 cm$^3$ of the above monomer solution was introduced thereinto. The bag was resealed, then set up on a constant-temperature shaking water bath and reacted at 25° C. for 300 minutes. Thereafter, the reaction substance was washed by being immersed in 1,200 cm$^3$ of a 50% by volume aqueous solution of methanol (manufactured by Wako Pure Chemical Industries, Ltd., JIS special grade) at 25° C. for 1 hour. This washing operation was repeated for a total of 3 times, and thereafter the washed substance was dried, to obtain a hydrophilic porous sintered material with a graft ratio of 7.2%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 10

A plate-shaped sintered material was prepared using the ultrahigh molecular weight high density polyethylene powder used in Example 8. The sintered material was put in a polyethylene bag, and the bag was sealed with nitrogen gas and exposed to 50 kGy γ-ray while cooling to −60° C. with dry ice. A 25% by volume aqueous solution of tert-butanol (manufactured by Wako Pure Chemical Industries, Ltd., Wako special grade) was mixed with 2-diethylaminoethyl methacrylate (manufactured by Wako Pure Chemical Industries, Ltd., Wako 1st grade), to prepare a 5% by volume monomer solution, and dissolved oxygen was removed by bubbling nitrogen at 25° C. for 120 minutes. The polyethylene bag in which the above sintered material was put was opened in a glove bag replaced with nitrogen gas, and 300 cm$^3$ of the above monomer solution was introduced thereinto. The bag was resealed, then set up on a constant-temperature shaking water bath and reacted at 25° C. for 120 minutes. Thereafter, the reaction substance was washed by being immersed in 1,200 cm$^3$ of a 50% by volume aqueous solution of methanol (manufactured by Wako Pure Chemical Industries, Ltd., JIS special grade) at 25° C. for 1 hour. This washing operation was repeated for a total of 3 times, and thereafter the washed substance was dried, to obtain a hydrophilic porous sintered material with a graft ratio of 2.5%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 11

A shaped sintered material was prepared using a ultrahigh density polyethylene powder (SUNFINE (registered trademark) UL901 manufactured by Asahi Kasei Chemicals Corporation) having an average diameter of 162 μm, a cumulative diameter of the particles having a particle diameter in the range of 1 to 500 μm of 90% by weight or more, a bulk density of 0.41 g/cm$^3$, a density of 0.920 g/cm$^3$ and a viscosity average molecular amount of 3,700,000. The sintered material was put in a polyethylene bag, and the bag was sealed with nitrogen gas and exposed to 150 kGy γ-ray while cooling to −60° C. with dry ice. A 25% by volume aqueous solution of methanol (manufactured by Wako Pure Chemical Industries, Ltd., JIS special grade) was mixed with vinyl sulfonate (manufactured by Asahi Kasei Finechem Co., Ltd.), to prepare a 3% by volume monomer solution, and dissolved oxygen was removed by bubbling nitrogen at 40° C. for 120 minutes. The polyethylene bag in which the above sintered material was put was opened in a glove bag replaced with nitrogen gas, and 250 cm$^3$ of the above monomer solution was introduced thereinto. The bag was resealed, then set up on a constant-temperature shaking water bath and reacted at 40° C. for 60 minutes. Thereafter, the reaction substance was washed by being immersed in 1,200 cm$^3$ of a 50% by volume aqueous solution of methanol (manufactured by Wako Pure Chemical Industries, Ltd., JIS special grade) at 25° C. for 1 hour. This washing operation was repeated for a total of 3 times, and thereafter the washed substance was dried, to obtain a hydrophilic porous sintered material with a graft ratio of 1.3%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component.

Example 12

The same procedures as Example 11 were carried out except that the concentration of the monomer solution was 1% by volume, to obtain a hydrophilic porous sintered material with a graft ratio of 0.7%. The average porosity, the average pore diameter, the drop absorption time and the water suction height of the resulting hydrophilic porous sintered material are shown in Table 2. The hydrophilic porous sintered material showed excellent water absorbing functions even after removing a 60° C. hot water-soluble component,

TABLE 2

| | Average Porosity (% by Volume) | Average Pore Diameter (μm) [1] | Average Pore Diameter (μm) [2] | Before Removal of 60° C. Hot Water-Soluble Component | | After Removal of 60° C. Hot Water-Soluble Component | |
|---|---|---|---|---|---|---|---|
| | | | | Drop Absorption Time (sec) | Water Suction Height (mm/min) | Drop Absorption Time (sec) | Water Suction Height (mm/min) |
| Example 2 | 40 | 23 | 25 | 8.0 | 40 | 6.4 | 36 |
| Example 3 | 42 | 25 | 25 | 2.7 | 34 | 2.5 | 34 |
| Example 4 | 41 | 49 | 52 | 1.4 | 26 | 1.1 | 32 |
| Example 5 | 42 | 25 | 26 | 0.4 | 67 | 0.5 | 55 |
| Example 6 | 42 | 25 | 25 | 0.3 | 64 | 0.4 | 51 |
| Example 7 | 45 | 11 | 7 | 0.8 | 62 | 1.0 | 61 |
| Example 8 | 47 | 21 | 18 | 2.2 | 32 | 2.4 | 30 |
| Example 9 | 46 | 21 | 20 | 3.7 | 49 | 5.8 | 37 |
| Example 10 | 47 | 19 | 19 | 7.2 | 26 | 8.5 | 22 |
| Example 11 | 43 | 23 | 24 | 6.5 | 28 | 6.7 | 25 |
| Example 12 | 43 | 25 | 24 | 17.8 | 19 | 21.2 | 18 |

[1] Determined by Pore Size Meter PSM165
[2] Determined by Automated Porosimeter Auto Pore IV9510

Example 13

A plate-shaped sintered material was prepared using the high density polyethylene powder used in Example 4. The above sintered material was immersed in a solution obtained by dissolving 1 g of benzophenone (manufactured by Sigma-Aldrich Japan K.K.) in 1,000 cm$^3$ of acetone for 1 minute under protection from light, and then the sintered material taken out was dried under reduced pressure for 1 hour in a condition protected from light. A 0.25 mmol/cm$^3$ aqueous solution of 2-methacryloyloxyethyl phosphorylcholine synthesized according to a method described in Ishihara K, Ueda T, Nakabayashi N., Polymer Journal, 22, 355-360 (1990) was prepared, and dissolved oxygen was removed by bubbling nitrogen at 40° C. for 30 minutes. The above sintered material treated with the acetone solution of benzophenone was immobilized in 1,200 cm$^3$ of the above aqueous solution, adjusted to a temperature of 60° C. and exposed to ultraviolet light for 90 minutes using a high-pressure mercury lamp UVL-400HA (trade name) (manufactured by Riko Kagaku Sangyo K.K.). Thereafter, the reaction substance was washed by being immersed in 1,200 cm$^3$ of ion exchange water and 1,200 cm$^3$ of methanol (manufactured by Wako Pure Chemical Industries, Ltd., JIS special grade) respectively at 25° C. for 8 hours. This washing operation was repeated for a total of 3 times, and thereafter the washed substance was dried, to obtain a hydrophilic porous sintered material with a graft ratio of 0.40%. The average porosity, the average pore diameter, the drop absorption time and the water suction height of the resulting hydrophilic porous sintered material are shown in Table 3. The hydrophilic porous sintered material showed excellent water absorbing functions even after removing a 60° C. hot water-soluble component.

Example 14

The same procedures as Example 13 were carried out except that the ultrahigh molecular weight high density polyethylene powder used in Example 1 was used, to obtain a hydrophilic porous sintered material with a graft ratio of 0.28%. The average porosity, the average pore diameter, the drop absorption time and the water suction height of the resulting hydrophilic porous sintered material are shown in Table 3. The hydrophilic porous sintered material showed excellent water absorbing functions even after removing a 60° C. hot water-soluble component Example 15

A plate-shaped sintered material was prepared using the ultrahigh molecular weight high density polyethylene powder used in Example 1. The sintered material was put in a polyethylene bag, and the bag was sealed with nitrogen gas and exposed to 200 kGy γ-ray while cooling −60° C. with dry ice. A 25% by volume aqueous solution of tert-butanol (manufactured by Wako Pure Chemical Industries, Ltd., Wako special grade) was mixed with 2-methacryloyloxyethyl phosphorylcholine synthesized according to a method described in Ishihara K, Ueda T, Nakabayashi N., Polymer Journal, 22, 355-360 (1990), to prepare a 3.6% by volume monomer solution, and dissolved oxygen was removed by bubbling nitrogen at 15° C. for 120 minutes. The polyethylene bag in which the above sintered material was put was opened in a glove bag replaced with nitrogen gas, and 300 cm$^3$ of the above monomer solution was introduced thereinto. The bag was resealed, then set up on a constant-temperature water bath and reacted at 15° C. for 120 minutes. Thereafter, the reaction substance was washed by being immersed in 1,200 cm$^3$ of a 50% by volume aqueous solution of methanol (manufactured by Wako Pure Chemical Industries, Ltd., JIS special grade) at 25° C. for 1 hour. This washing operation was repeated for total of 3 times, and thereafter the washed substance was dried, to obtain a hydrophilic porous sintered material with a graft ratio of 0.87%. The average porosity, the average pore diameter, the drop absorption time and the water suction height of the resulting hydrophilic porous sintered material are shown in Table 3. The hydrophilic porous sintered material showed excellent water absorbing functions even after removing a 60° C. hot water-soluble component.

Example 16

The same procedures as Example 15 were carried out except that the concentration of the monomer solution was 0.7% by weight, and the time of the reaction of the sintered material after the exposure to γ-ray with the monomer solution was 1,020 minutes, to obtain a hydrophilic porous sintered material with a graft ratio of 0.45%. The average porosity, the average pore diameter, the drop absorption time and the water suction height of the resulting hydrophilic porous sintered material are shown in Table 3. The hydrophilic porous sintered material showed excellent water absorbing functions even after removing a 60° C. hot water-soluble component.

Example 17

The same procedures as Example 15 were carried out except that the temperature of the reaction of the sintered material after the exposure to γ-ray with the monomer solution was 37° C., and the reaction time was 75 minutes, to obtain a hydrophilic porous sintered material with a graft ratio of 0.41%. The average porosity, the average pore diameter, the drop absorption time and the water suction height of the resulting hydrophilic porous sintered material are shown in Table 3. The hydrophilic porous sintered material showed excellent water absorbing functions even utter removing a 60° C. hot water-soluble component.

Example 18

The same procedures as Example 16 were carried out except that the γ-ray exposure level was 50 kGy, to obtain a hydrophilic porous sintered material with a graft ratio of 0.52%. The average porosity, the average pore diameter, the drop absorption time and the water suction height of the resulting hydrophilic porous sintered material are shown in Table 3. The hydrophilic porous sintered material showed excellent water absorbing functions even after removing a 60° C. hot water-soluble component.

der used in Example 1. The average porosity, the average pore diameter, the drop absorption time and the water suction height the resulting porous sintered material are shown in Table 4. The water absorbing functions of the porous sintered material were not found.

Comparative Example 4

A plate-shaped sintered material was prepared using the high density polyethylene powder used in Example 4. The average porosity, the average pore diameter, the drop absorption time and the water suction height of the resulting porous sintered material are shown in Table 4. The water absorbing functions of the porous sintered material were not found.

Comparative Example 5

A plate-shaped sintered material was prepared using the ultrahigh molecular weight high density polyethylene powder used in Example 1. The sintered material was put in an aluminum evaporated polyethylene bag, and the bag was sealed with nitrogen gas and exposed to 200 kGy γ-ray at 25° C. A 25% by volume aqueous solution of tert-butanol (manufactured by Wako Pure Chemical Industries, Ltd., Wako special grade) was mixed with hydroxypropyl acrylate (manufactured by Wako Pure Chemical Industries, Ltd., isomeric mixture, the content of 2-hydroxypropyl acrylate is 90% or more), to prepare a 5% by volume monomer solution. At this time, the removal of dissolved oxygen by bubbling nitrogen was not carried out. The sintered material after the exposure

TABLE 3

| | | | | Before Removal of 60° C. Hot Water-Soluble Component | | After Removal of 60° C. Hot Water-Soluble Component | |
|---|---|---|---|---|---|---|---|
| | Average Porosity (% by Volume) | Average Pore Diameter (μm) [1] | Average Pore Diameter (μm) [2] | Drop Absorption Time (sec) | Water Suction Height (mm/min) | Drop Absorption Time (sec) | Water Suction Height (mm/min) |
| Example 13 | 42 | 50 | 52 | 0.4 | 36 | 0.7 | 33 |
| Example 14 | 42 | 25 | 25 | 6.7 | 33 | 7.9 | 32 |
| Example 15 | 42 | 23 | 25 | 0.1 or less | 47 | 0.1 or less | 68 |
| Example 16 | 42 | 25 | 26 | 0.1 or less | 48 | 0.1 or less | 62 |
| Example 17 | 42 | 25 | 25 | 0.1 or less | 55 | 0.8 | 57 |
| Example 18 | 42 | 25 | 24 | 0.1 or less | 53 | 10.2 | 25 |

[1] Determined by Pore Size Meter PSM165
[2] Determined by Automated Porosimeter Auto Pore IV9510

Comparative Example 2

To 100 parts by weight of the high density polyethylene powder used in Example 4 was added 0.3 parts by weight of polyoxyethylene sorbitan monolaurate, and the mixture was dry-mixed with a high-speed mixer while heated to 100° C. A plate-shaped sintered material was prepared using the resulting hydrophilic powder. The average porosity, the average pore diameter, the drop absorption time and the water suction height of the resulting hydrophilic porous sintered material are shown in Table 4. The water absorbing functions of the hydrophilic porous sintered material were completely lost by removing a 60° C. hot water-soluble component.

Comparative Example 8

A plate-shaped sintered material was prepared using the ultrahigh molecular weight high density polyethylene powto γ-ray was charged in a reaction vessel, and then 1,200 cm$^3$ of the above monomer solution was introduced under atmospheric pressure, to react at 40° C. for 60 minutes. Thereafter, the reaction substance was washed by being immersed in 1,200 cm$^3$ of a 50% by volume aqueous solution of 2-propanol (manufactured by Wako Pure Chemical Industries, Ltd., JIS special grade) at 25° C. for 20 minutes, and this washing operation was repeated for a total of 3 times, and thereafter the washed substance was dried, to obtain a hydrophilic porous sintered material with a graft ratio of 1.2%. The average porosity and the average pore diameter of the resulting porous sintered material are shown in Table 4. This porous sintered material was ununiformly hydrophilized, and this caused uneven water absorption. It should be noted that the ratio of maximum, value Y to minimum value X of the water suction height, i.e., Y/X, was 14 times, which largely reflected uneven water absorption. In addition, the ratio after removing a 60° C. hot water-soluble component was 20 times, and uneven water absorption was further expanded.

Comparative Example 6

The amount 20 g of the ultrahigh molecular weight high density polyethylene powder used in Example 1 was put in an aluminum evaporated polyethylene bag, and the bag was sealed under atmospheric pressure and exposed to 100 kGy γ-ray at 25° C. A 25% by volume aqueous solution of tert-butanol (manufactured by Wako Pure Chemical Industries, Ltd., Wako special grade) was mixed with hydroxypropyl acrylate (manufactured by Wake Pure Chemical Industries, Ltd., isomeric mixture, the content of 2-hydroxypropyl acrylate is 90% or more), in prepare 200 cm$^3$ of a 5% by volume monomer solution. At this time, the removal of dissolved oxygen by bubbling nitrogen was not carried out. The powder after the exposure to γ-ray was charged to the above monomer solution under atmospheric pressure, to react at 40° C. for 60 minutes. Thereafter, the reaction slurry was filtrated with a Buchner funnel and washed by stirring in 1,200 cm$^3$ of 2-propanol (manufactured by Wako Pure Chemical Industries, Ltd., JIS special grade) and 1,200 cm$^3$ of ion exchange water respectively at 25° C. for 1 hour, and this washing operation was repeated for a total of 3 times, and thereafter the washed slurry was dried. A plate-shaped sintered material was prepared using a mixed powder of 100 parts by weight of this powder and 100 parts by weight of the powder before hydrophilization. The graft ratio was 0.3%. The average porosity, the average pore diameter, the drop absorption time and the water suction height of the resulting porous sintered material are shown in Table 4. The water absorbing functions of the porous sintered material were not found.

Comparative Example 7

A plate-shaped sintered material was prepared using the ultrahigh molecular weight high density polyethylene powder used in Example 1. The sintered material was put in a polyethylene bag, and the bad was sealed with nitrogen gas and exposed to 200 kGy γ-ray while cooling to −60° C. with dry ice. A 25% by volume aqueous solution of tert-butanol (manufactured by Wako Pure Chemical Industries, Ltd., Wako special grade) was mixed with hydroxypropyl acrylate (manufactured by Wako Pure Chemical Industries, Ltd., isomeric mixture, the content of 2-hydroxypropyl acrylate is 90% or more), to prepare an 8.4% by volume monomer solution, and dissolved oxygen was removed by bubbling nitrogen at 25° C. for 120 minutes. The polyethylene bag in which the above sintered material was put was opened in a glove bag replaced with nitrogen gas, and 300 cm$^3$ of the above monomer solution was introduced thereinto. The bag was resealed, then set up on a constant-temperature shaking water bath and reacted at 25° C. for 960 minutes. Thereafter, the reaction substance was washed by being immersed in 1,200 cm$^3$ of a 50% by volume aqueous solution of methanol (manufactured by Wako Pure Chemical Industries, Ltd., JIS special grade) at 25° C. for 1 hour. This washing operation was repeated for a total of 3 times, and thereafter the washed substance was dried, to obtain a plate-shaped sheet with a graft ratio of 32.1%. While the resulting plate-shaped sheet was hydrophilized on the surface, fine pores of the sintered material were clogged, and the water absorbing functions as the hydrophilic porous material were not found.

Comparative Example 8

A plate-shaped sintered material was prepared using the ultrahigh molecular weight high density polyethylene powder used in Example 1. Using a low-pressure mercury lamp VUV-65B-22-21 (trade name) (manufactured by OAK Corporation, wavelength: 185 nm, 254 nm) having an output of 650W, the sintered material was supported in a distance of 10 cm from the lamp and exposed both sides for 10 minutes each. This sintered material was immersed in 1,000 cm$^3$ of a 5% by weight acetone solution of benzophenone (manufactured by Sigma-Aldrich Japan K.K.) for 10 minutes and then taken out and air-dried for 15 minutes. A cylindrical glass vessel was charged with 200 cm$^3$ of a 25% aqueous solution of sodium vinyl sulfonate (manufactured by Wako Pure Chemical Industries, Ltd., practical grade), and the above sintered material was immersed therein, and the cylindrical vessel was put in a large bell jar, and the pressure was reduced to 20 to 40 torr with an aspirator. It should be noted that the removal of dissolved oxygen by bubbling nitrogen was not carried out at all. When the pressure was reduced, many bubbles were generated from the sintered material. When the sintered material impregnated with the monomer solution was taken out, a water-repellent area due to the influence of a hydrophobic surface was found, which resulted in uneven impregnation. The sintered material was slipped in between A4 size glass plates (2 mm thickness) and pinched with clips around the glass plates. The glass plates in which the sintered material was tuck were exposed to ultraviolet light for 11 minutes using a high-pressure mercury lamp UVL-400HA (manufactured by Riko Kagaku Sangyo K.K.), to perform graft polymerization. After the graft polymerization, the sintered material was removed from the glass plates, immersed in ion exchange water, and washed with water for 4 hours while stirred with a magnetic stirrer. The sintered material was taken out, pinched with a clip at the top and bottom, hung in a drier at 80° C. and dried for 2 hours, to obtain a plate-shaped sheet with a graft ratio of 1.5%. The average porosity, the average pore diameter, the drop absorption time and the water suction height of the resulting porous sintered material are shown in Table 4. The resulting plate-shaped sheet had a portion of the surface made hydrophilic and a decrease in the angle of contact was noted when a drop was dropped. However, water did not penetrate fine pores of the sintered material, and the water absorbing function as the hydrophilic porous material was hardly found.

TABLE 4

| | Average Porosity (% by Volume) | Average Pore Diameter (μm)[1] | Average Pore Diameter (μm)[2] | Before Removal of 60° C. Hot Water-Soluble Component | | After Removal of 60° C. Hot Water-Soluble Component | |
|---|---|---|---|---|---|---|---|
| | | | | Drop Absorption Time (sec) | Water Suction Height (mm/min) | Drop Absorption Time (sec) | Water Suction Height (mm/min) |
| Comparative Example 2 | 42 | 50 | 51 | 0.7 | 41 | Undeterminable (Not Absorbed) | 0 |
| Comparative Example 3 | 42 | 25 | 25 | Undeterminable (Not Absorbed) | 0 | Undeterminable (Not Absorbed) | 0 |

TABLE 4-continued

| | Average Porosity (% by Volume) | Average Pore Diameter (μm) [1] | Average Pore Diameter (μm) [2] | Before Removal of 60° C. Hot Water-Soluble Component | | After Removal of 60° C. Hot Water-Soluble Component | |
|---|---|---|---|---|---|---|---|
| | | | | Drop Absorption Time (sec) | Water Suction Height (mm/min) | Drop Absorption Time (sec) | Water Suction Height (mm/min) |
| Comparative Example 4 | 42 | 50 | 52 | Undeterminable (Not Absorbed) | 0 | Undeterminable (Not Absorbed) | 0 |
| Comparative Example 5 | 40 | 24 | 26 | Not Determined (Uneven Absorption) | Not Determined (Uneven Absorption) | Not Determined (Uneven Absorption) | Not Determined (Uneven Absorption) |
| Comparative Example 6 | 42 | 27 | 27 | Undeterminable (Not Absorbed) | 0 | Undeterminable (Not Absorbed) | 0 |
| Comparative Example 8 | 42 | 25 | 26 | Undeterminable (Not Absorbed) | 0 | Undeterminable (Not Absorbed) | 0 |

[1] Determined by Pore Size Meter PSM165
[2] Determined by Automated Porosimeter Auto Pore IV9510

INDUSTRIAL APPLICABILITY

The hydrophilic polyolefin sintered material obtained according to the present invention is industrially producible, has continuous pores, is excellent in long-lasting sustainability of water-absorbing functions and low dissolubility, and is useful as a porous material which is excellent in discoloration resistance, biocompatibility, moldability, impact resistance, mechanical strength and dimension stability upon absorbing water.

The invention claimed is:

1. A hydrophilic polyolefin sintered material which is a water-absorbing sintered material of polyolefin resin particles having a graft chain comprising
at least one molecular chain selected from hydrophilic ethylenically unsaturated group-containing monomers and polymers thereof,
wherein the hydrophilic polyolefin sintered material has an average porosity of 20% to 80% by volume and a continuous pore having an average pore diameter of 1 to 150 μm, and
wherein the hydrophilic polyolefin sintered material after being immersed for 7 hours in 60° C. hot water has a drop absorption time of 30 seconds or less and a water suction height of 5 mm or more per minute.

2. The hydrophilic polyolefin sintered material according to claim 1, wherein the hydrophilic ethylenically unsaturated group-containing monomers have at least one functional group selected from a phosphorylcholine group, a hydroxyl group, a carboxyl group, an amino group, an amide group, an alkoxy group, a sulfo group or salts thereof.

3. The hydrophilic polyolefin sintered material according to claim 1, wherein the hydrophilic ethylenically unsaturated group-containing monomers comprise at least one monomer selected from methacryloyloxyalkyl phosphorylcholines and acryloyloxyalkyl phosphorylcholines represented by the following general formula (I):

[Formula 1]

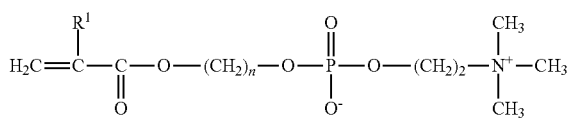

(1)

wherein, $R^1$ is a hydrogen atom or a methyl group, and n is an integer number of 2 to 10.

4. The hydrophilic polyolefin sintered material according to claim 1, wherein the hydrophilic ethylenically unsaturated group-containing monomers comprise at least one monomer selected from 2-methacryloyloxyethyl phosphorylcholine, 2-hydroxypropyl acrylate, 2-hydroxyethyl methacrylate, 2-diethylaminoethyl methacrylate and vinyl sulfonic acid.

5. The hydrophilic polyolefin sintered material according to claim 1, wherein the hydrophilic ethylenically unsaturated group-containing monomers have a graft ratio of 0.01% to 50%.

6. The hydrophilic polyolefin sintered material according to claim 1, wherein the polyolefin is a homopolymer of ethylene or a copolymer of ethylene and an olefin having 3 or more carbon atoms.

7. The hydrophilic polyolefin sintered material according to claim 1, wherein the polyolefin resin particles comprising the hydrophilic polyolefin sintered material have an average particle diameter of 10 to 350 μm, a particle diameter of 90% by weight or more of the particles in the range of 1 to 500 μm, a bulk density of 0.20 to 0.55 g/cm³, a density of 0.850 to 0.970 g/cm³, and a viscosity-average molecular weight of 50,000 to 7,000,000.

8. The hydrophilic polyolefin sintered material according to claim 1, having a ratio of maximum value Y to minimum value X of the water suction height, i.e., Y/X, in the range of 1.0 to 2.0 times per minute.

9. The hydrophilic polyolefin sintered material according to claim 1, wherein the hydrophilic polyolefin sintered material after removing a 60° C. hot water-soluble component has a ratio of maximum value Y to minimum value X of the water suction height, i.e., Y/X, in the range of 1.0 to 2.0 times per minute.

10. A method of producing the hydrophilic polyolefin sintered material according to claim 1, comprising the step of grafting at least one molecular chain selected from the hydrophilic ethylenically unsaturated group-containing monomers and polymers thereof onto polyolefin resin particles or a sintered material thereof in a liquid phase.

11. The method of producing the hydrophilic polyolefin sintered material according to claim 10, comprising the step of grafting at least one molecular chain selected from the hydrophilic ethylenically unsaturated group-containing monomers and polymers thereof onto polyolefin resin particles or a sintered material thereof in a liquid phase from which dissolved oxygen is removed.

12. The method of producing the hydrophilic polyolefin sintered material according to claim 10, wherein the polyolefin resin particles are packed into a mold and thereby sinter-molded.

13. The method of producing the hydrophilic polyolefin sintered material according to claim 10, wherein the polyolefin resin particles are deposited and thereby sinter-molded.

14. The method of producing the hydrophilic polyolefin sintered material according to claim 10, wherein the polyolefin resin particles is sinter-molded and thereafter at least one molecular chain selected from the hydrophilic ethylenically unsaturated group-containing monomers and polymers thereof is grafted.

15. The method of producing the hydrophilic polyolefin sintered material according to claim 10, wherein at least one molecular chain selected from the hydrophilic ethylenically unsaturated group-containing monomers and polymers thereof is previously grafted onto the polyolefin resin particles and thereafter the particles are sinter-molded.

16. The method of producing the hydrophilic polyolefin sintered material according to claim 10, wherein grafting is carried out by exposure to ionizing radiation.

17. The method of producing the hydrophilic polyolefin sintered material according to claim 16, wherein the ionizing radiation is γ-ray.

18. The method of producing the hydrophilic polyolefin sintered material according to claim 16, wherein the exposure dose of the ionizing radiation is in the range of 1 kGy to 1,000 kGy.

19. The method of producing the hydrophilic polyolefin sintered material according to claim 16, wherein the hydrophilic polyolefin sintered material is obtained by previously exposing polyolefin resin particles or a sintered material thereof to ionizing radiation and thereafter contacting the particles or sintered material with hydrophilic ethylenically unsaturated group-containing monomers.

20. The method of producing the hydrophilic polyolefin sintered material according to claim 10, wherein grafting is carried out by exposure to an active light.

* * * * *